United States Patent
Kumar

(10) Patent No.: US 10,069,861 B2
(45) Date of Patent: *Sep. 4, 2018

(54) EMPLOYING PHYSICAL LOCATION GEO-SPATIAL CO-ORDINATE OF COMMUNICATION DEVICE AS PART OF INTERNET PROTOCOL

(71) Applicant: AT&T Mobility II LLC, Atlanta, GA (US)

(72) Inventor: Saurabh Kumar, Jersey City, NJ (US)

(73) Assignee: AT&T Mobility II LLC, Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/683,141

(22) Filed: Aug. 22, 2017

(65) Prior Publication Data

US 2017/0353489 A1 Dec. 7, 2017

Related U.S. Application Data

(63) Continuation of application No. 15/205,495, filed on Jul. 8, 2016, now Pat. No. 9,756,072, which is a
(Continued)

(51) Int. Cl.
*H04W 40/20* (2009.01)
*H04L 29/06* (2006.01)
(Continued)

(52) U.S. Cl.
CPC ...... *H04L 63/1466* (2013.01); *H04L 61/2007* (2013.01); *H04L 61/6004* (2013.01);
(Continued)

(58) Field of Classification Search
CPC ............ H04L 63/1466; H04L 61/6004; H04L 61/609; H04L 61/2007; H04L 63/1483;
(Continued)

(56) References Cited

U.S. PATENT DOCUMENTS 6,829,230 B1 12/2004 Tiuri
6,980,566 B2 12/2005 Melick et al.
(Continued)

OTHER PUBLICATIONS

Das, "IPv6 Addressing" IPv6.com <http://www.ipv6.com/articles/general/IPv6-Addressing.htm>, 3 pages.
(Continued)

*Primary Examiner* — Thai Nguyen
(74) *Attorney, Agent, or Firm* — Amin, Turocy & Watson, LLP

(57) ABSTRACT

A current physical location value associated is incorporated with a communication device as part of internet protocol (IP). An IP management component obtains current physical location information of a wireless communication device and modifies the IP address to incorporate the current physical location value corresponding to the current physical location of the communication device as part of the IP address of the communication device to prevent undesired intrusions by hackers, as communications associated with the communication device are routed to/from the communication device that is at the current physical location. If the communication device moves to a new location, the IP management component can perform a new IP address modification to modify the IP address to incorporate a new physical location value associated with the communication device.

20 Claims, 10 Drawing Sheets

Related U.S. Application Data continuation of application No. 14/659,158, filed on Mar. 16, 2015, now Pat. No. 9,420,455, which is a continuation of application No. 14/308,267, filed on Jun. 18, 2014, now Pat. No. 9,014,144, which is a continuation of application No. 13/967,789, filed on Aug. 15, 2013, now Pat. No. 8,792,455, which is a continuation of application No. 12/538,407, filed on Aug. 10, 2009, now Pat. No. 8,553,646.

(51) Int. Cl.
| | | |
|---|---|---|
| *H04W 4/02* | (2018.01) | |
| *H04L 29/12* | (2006.01) | |
| *H04W 8/26* | (2009.01) | |
| *H04W 12/08* | (2009.01) | |
| *H04W 12/12* | (2009.01) | |
| *H04W 12/02* | (2009.01) | |

(52) U.S. Cl.
CPC ........ *H04L 61/609* (2013.01); *H04L 63/1483* (2013.01); *H04W 4/02* (2013.01); *H04W 8/26* (2013.01); *H04W 12/02* (2013.01); *H04W 12/08* (2013.01); *H04W 12/12* (2013.01); *H04W 40/20* (2013.01)

(58) Field of Classification Search
CPC ..... H04W 12/12; H04W 40/20; H04W 12/02; H04W 8/26; H04W 4/02; H04W 12/08
See application file for complete search history.

(56) References Cited

U.S. PATENT DOCUMENTS

| | | | |
|---|---|---|---|
| 7,653,813 B2 * | 1/2010 | Venkitaraman | H04L 29/1232 370/331 |
| 2008/0008179 A1 * | 1/2008 | Chen | H04L 61/2007 370/392 |
| 2009/0010262 A1 | 1/2009 | Sugai et al. | |
| 2009/0016517 A1 * | 1/2009 | Emmanuel | H04M 3/5116 379/207.12 |

OTHER PUBLICATIONS

Hinden et al, "RFC1884—IP Version 6 Addressing Architecture" <http://www.faqs.org/rfcs/rfc1884.html>, 23 pages.
IP2Location Internet IP Address 2009 Report IP2Location <http://www.ip2location.com/ip2location-internet-ip-address-2009-report.aspx>, 6 pages.
IPligence Geolocation Solutions IPligence <http://www.ipligence.com/about>, 6 pages.
Office Action dated Oct. 24, 2012 for U.S. Appl. No. 12/538,407, 33 pages.
Notice of Allowance dated Mar. 19, 2014 for U.S. Appl. No. 13/967,789, 32 pages.
Office Action dated Aug. 26, 2014 for U.S. Appl. No. 14/308,267, 31 pages.
Office Action dated Sep. 23, 2015 for U.S. Appl. No. 14/659,158, 13 pages.
Office Action dated Apr. 23, 2015 for U.S. Appl. No. 14/659,158, 33 pages.
Office Action dated Jan. 13, 2017 for U.S. Appl. No. 15/205,495, 17 pages.

\* cited by examiner

EMPLOYING PHYSICAL LOCATION GEO-SPATIAL CO-ORDINATE OF COMMUNICATION DEVICE AS PART OF INTERNET PROTOCOL

CROSS REFERENCE TO RELATED APPLICATIONS

This application is a continuation of, and claims priority to each of, U.S. patent application Ser. No. 15/205,495, filed on Jul. 8, 2016, and entitled "EMPLOYING PHYSICAL LOCATION GEO-SPATIAL CO-ORDINATE OF COMMUNICATION DEVICE AS PART OF INTERNET PROTOCOL," which is a continuation of U.S. patent application Ser. No. 14/659,158 (now U.S. Pat. No. 9,420,455), filed on Mar. 16, 2015, and entitled "EMPLOYING PHYSICAL LOCATION GEO-SPATIAL CO-ORDINATE OF COMMUNICATION DEVICE AS PART OF INTERNET PROTOCOL," which is a continuation of U.S. patent application Ser. No. 14/308,267 (now U.S. Pat. No. 9,014,144), filed on Jun. 18, 2014, and entitled "EMPLOYING PHYSICAL LOCATION GEO-SPATIAL CO-ORDINATE OF COMMUNICATION DEVICE AS PART OF INTERNET PROTOCOL", which is a continuation of U.S. patent application Ser. No. 13/967,789 (now U.S. Pat. No. 8,792,455), filed on Aug. 15, 2013, and entitled "EMPLOYING PHYSICAL LOCATION GEO-SPATIAL CO-ORDINATE OF COMMUNICATION DEVICE AS PART OF INTERNET PROTOCOL", which is a continuation of U.S. patent application Ser. No. 12/538,407 (now U.S. Pat. No. 8,553,646), filed on Aug. 10, 2009, and entitled "EMPLOYING PHYSICAL LOCATION GEO-SPATIAL CO-ORDINATE OF COMMUNICATION DEVICE AS PART OF INTERNET PROTOCOL." The entireties of the foregoing listed applications are hereby incorporated by reference herein.

TECHNICAL FIELD

The subject application generally relates to wireless communications, and, more particularly, to employing a physical location geo-spatial co-ordinate associated with a communication device as part of internet protocol.

BACKGROUND

Many wireless communication devices (e.g., mobile phones, laptop computers, etc.) have the ability to access the internet to receive data from or send data to other communication devices. Security in wireless communication is paramount as communication device users often communicate sensitive or personal information via a wireless connection.

Conventionally, when communication devices are communicating via an internet connection, each communication device is assigned a respective internet protocol (IP) address, so that the communication network knows how to route the traffic and data sent from a source communication device is properly routed to the desired destination communication device. One common type of security attack is known as "spoofing", where a hacker replaces IP address information in a data packet with fake information, such as a fake IP address, so that a communication device and associated user that receives the data packet mistakenly believes that the data packet came from another source, where the other source may be a trusted source of the user. In wireless communication, a hacker may be able to obtain a conventional IP address associated with a wireless communication device and use it to spoof communication devices and associated communication device users thereby breaching the security of the data communications of these users. It is desirable to be able to secure IP addresses to facilitate securing data communications by communication devices in a wireless network.

DETAILED DESCRIPTION

Figure 1:
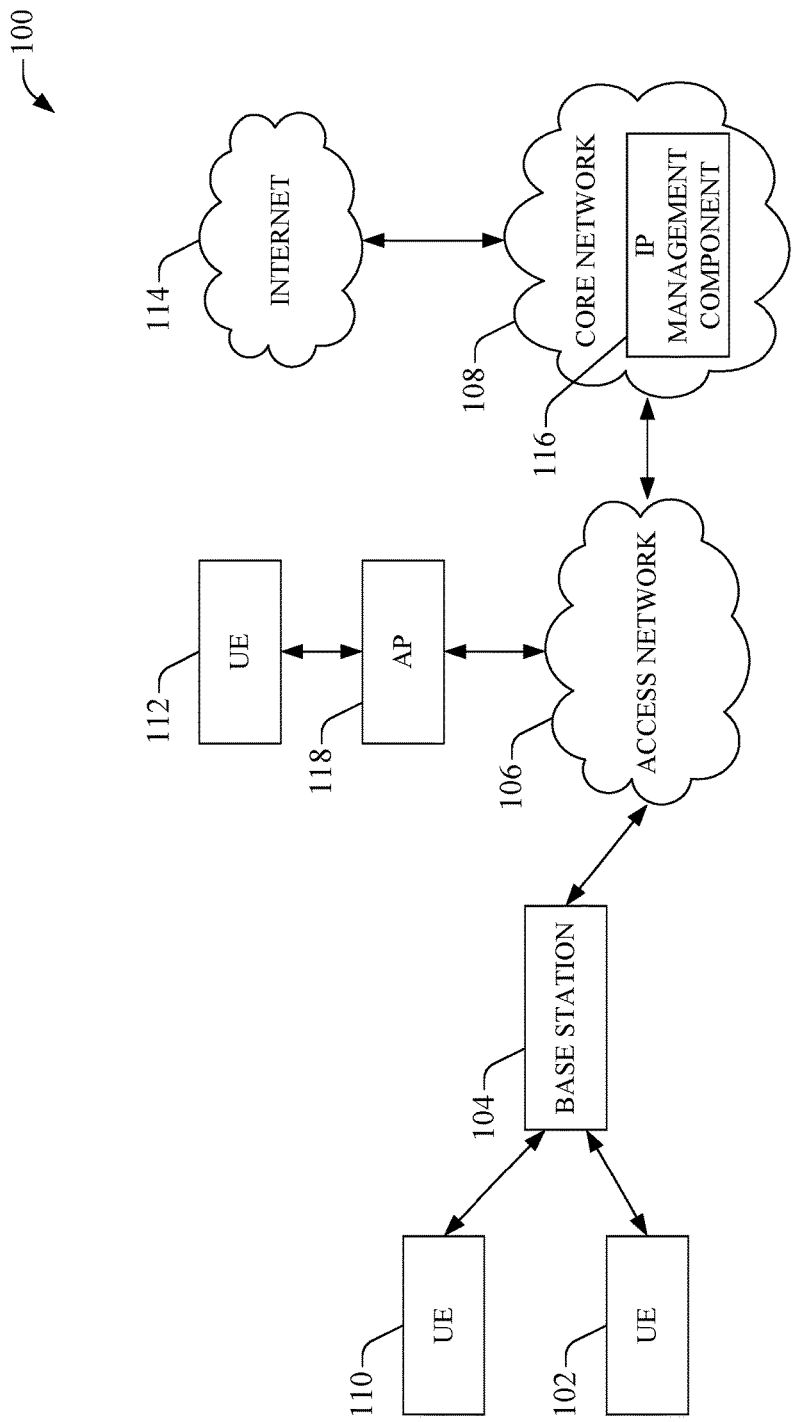
FIG. 1 is a block diagram of an example system that can incorporate a physical location value in an internet protocol (IP) address associated with a communication device in a communication network in accordance with an embodiment of the disclosed subject matter.

The subject application is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component," "system," "platform," and the like can refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment," "mobile station," "mobile," "subscriber station," "communication device," "access terminal," "terminal," "handset," and similar terminology, refer to a wireless device (e.g., cellular phone, smart phone, computer, personal digital assistant (PDA), set top box, Internet Protocol Television (IPTV), etc.) utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "home Node B (HNB)," and the like, are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows.

Furthermore, the terms "user," "subscriber," "customer," and the like are employed interchangeably throughout the subject specification, unless context warrants particular distinction(s) among the terms.

The following abbreviations are relevant to the subject specification.

3G Third Generation
3GPP Third Generation Partnership Project
AGPS Assisted GPS
AP Access Point
ADSL Asymmetric Digital Subscriber Line
AWS Advanced Wireless Services
BRAS Broadband Remote Access Server
BTA Basic Trading Area
CN Core Network
CS Circuit-Switched
CSCF Call Session Control Function
CPE Customer Premise Equipment
CPN Customer Premise Network
DHCP Dynamic Host Configuration Protocol
DSL Digital Subscriber Line
DSLAM Digital Subscriber Line Access Multiplexer
E911 Enhanced 911
FCC Federal Communications Commission
FL Forward Link
GGSN Gateway GPRS Service Node
GPRS General Packet Radio Service
GPS Global Positioning System
GW Gateway
HAP Home Access Point
HSS Home Subscriber Server
ISDN Integrated Services Digital Network
UE User Equipment
UTRAN Universal Terrestrial Radio Access Network
IMS IP Multimedia Subsystem
IP Internet Protocol
ISP Internet Service Provider
MSA Metropolitan Statistical Areas
MSISDN Mobile Subscriber ISDN Number
MTA Major Trading Areas
NAT Network Address Translation
NTP Network Time Protocol
O&M Operation and Maintenance
PC Personal Computer
PCS Personal Communications Service
PS Packet-Switched
PSTN Public Switched Telephone Network
RAN Radio Access Network
RBS Radio Base Station
RL Reverse Link
RNC Radio Network Controller
RSA Rural Service Area
SGSN Serving GPRS Support Node
SIP Session Initiation Protocol
USSD Unstructured Supplementary Service Data
VPN Virtual Private Network
WAP Wireless Application Protocol
XDSL Asynchronous-DSL or Synchronous-DSL The subject application provides a system(s), method(s), and device(s) that can incorporate a physical location value (e.g., a physical location geo-spatial co-ordinate) associated with a communication device (e.g., wireless communication device) as part of internet protocol (IP) to facilitate securing data communications between communication devices. In an aspect, an IP management component can obtain current physical location information (e.g., latitude, longitude, and/or altitude) relating to the current location of a communication device and can incorporate a current physical location value as part of the IP address of the communication device to prevent undesired intrusions by hackers, as communications associated with the communication device will be routed to/from the communication device at the current physical location. The IP management component can store the original IP address, current physical location value, modified IP address, associated mapping (e.g., mapping of IP address, current physical location value, modified IP address, and/or other information to each of the other parameters), and/or other information (e.g., randomly generated number) associated with the communication device in a translation table.

Thus, for example, when the IP management component detects data traffic that is ostensibly associated with the communication device based at least in part on the IP addresses associated with the data traffic (e.g., either the source IP address (e.g., source modified IP address) or destination IP address (e.g., destination modified IP address) is represented as being the IP address associated with the communication device), the IP management component can reference or retrieve the modified IP address and current physical location value associated with the communication device from the translation table. The IP management component also can obtain current physical location information and/or can obtain or generate a corresponding current physical location value for the source or destination communication device that is representing itself as being the communication device. The IP management component can compare the current physical location value of the communication device with the current physical location value of the source or destination communication device that is representing itself as being the communication device. If the respective current physical location values are the same value, the IP management component can determine that the source or destination communication device representing itself to be the communication device is, in fact, the communication device, and the data traffic can be routed to the communication device if it is the destination or from the communication device to another communication device if it is the source. If the respective current physical location values are not the same value, the IP management component can determine that the source or destination communication device representing itself to be the communication device is, in fact, not the communication device, and the data traffic can be discarded, flagged as a security issue, routed to another destination besides the destination provided in the data traffic, and/or another desired action can be taken by the IP management component. As a result, undesired intrusions by hackers can be prevented.

In accordance with an aspect, the IP management component can include search functionality and can search for IP addresses (e.g., modified IP addresses) that are respectively associated with communication devices in a defined location space or area (e.g., physical or geographic location) for a communication network. For each defined location space or area in the communication network, the IP management component can generate, maintain, and/or monitor a list of IP addresses respectively associated with communication devices that are detected to be physically in the defined location space or area (e.g., as desired, two-dimensional location space or three-dimensional location space, which can be defined by two or more of latitudinal co-ordinate (or a range of latitudinal co-ordinates), longitudinal co-ordinate (or a range of longitudinal co-ordinates), and/or altitudinal co-ordinate (or a range of altitudinal co-ordinates), as desired) on the communication network. When data traffic that is ostensibly associated with a modified IP address of a communication device is detected, the IP management component can reference the associated modified IP address in the particular list of IP addresses that contains the modified IP address to determine the defined location associated with that particular list of IP addresses, and can determine the current physical location and corresponding current physical location value of the communication device associated with the data traffic. If the current physical location value for the communication device associated with the detected data traffic is not the same as the physical location value, or within the range of physical location values, associated with the defined location space, the IP management component can prevent access to the communication network (e.g., prevent the data traffic from being communicated to the destination communication device; discard the data traffic associated with the communication device that is having its access prevented; route the data traffic to an alternate destination; or another desired action). If the current physical location value for the communication device associated with the detected data traffic is the same as the physical location value, or is within the range of physical location values, associated with the defined location space, the IP management component can allow access to the communication network (e.g., the data traffic can be communicated to the destination communication device).

In another aspect, if and when the communication device moves to a new physical location, the IP management component can obtain new physical location information identifying the new current physical location of the communication device, can obtain a new current physical location value based at least in part on the new physical location information, and can perform a new IP address modification to modify the IP address to incorporate the new physical location value associated with the communication device.

In still another aspect, the IP management component can define a physical location to a desired predefined level of granularity (e.g., a desired amount of physical location space in two or three dimensions). Thus, a predefined amount of two-dimensional or three-dimensional physical location space can be represented by a corresponding physical location value, and a communication device that is operating (e.g., transmitting or receiving data) within the predefined two-dimensional or three-dimensional physical location space can be associated with the physical location value associated with such physical location space and can continue to be associated with such physical location space and corresponding physical location value so long as the communication device is physically located within such physical location space. As a result, the subject application can maintain a desired balance between the level of security with regard to data communications in the communication network with the amount of overhead relating to maintaining and updating physical location values for communication devices in the communication network. For instance, a physical location value can be associated with a predefined amount of two-dimensional or three-dimensional physical location space at a desired level of granularity such that a desired level of security is maintained for data communications (e.g., the risk that a hacker's communication device will be within the same defined physical location space as a communication device being attacked by the hacker is relatively minimal), and the communication device can be moved around within such space without triggering a re-modification of the IP address due to moving the communication device around to another physical location when it is still within such space, where performing such a re-modification can result in a certain amount of overhead.

In accordance with various other aspects and embodiments, methods that can incorporate a physical location value associated with a communication device as part of IP are presented; and devices that can incorporate a physical location value associated with a communication device as part of IP are presented.

Referring to the drawings, FIG. 1 is a block diagram of an example system 100 that can incorporate a physical location value in an IP address associated with a communication device (e.g., UE) in a communication network in accordance with an embodiment of the disclosed subject matter. In an aspect, example system 100 can include a UE 102 (e.g., mobile and/or wireless communication device, such as a mobile phone (e.g., 3GPP UMTS phone), personal digital assistant (PDA), computer, IP television (IPTV), gaming console, set-top box, printer, etc.) in a communication environment (e.g., communication environment comprising a wireless portion and a wire-line portion of a communication network; communication environment comprising a wire-line communication network; communication environment comprising a wireless communication network). The UE 102 can be located in the wireless portion (e.g., region) of the communication network, for example. The UE 102 can be connected (e.g., wirelessly connected) to a base station 104 to facilitate communication in the wireless communication environment. The base station 104 can serve a coverage macro cell that can cover a specified area, and the base station 104 can service mobile wireless devices, such as UE 102, in the area covered by the macro cell, where such coverage can be achieved via a wireless link (e.g., uplink (UL), downlink (DL)). When an attachment attempt is successful, UE 102 can be served by base station 104 and incoming voice and data traffic can be paged and routed to the UE 102 through the base station 104, and outgoing voice and data traffic from the UE 102 can be paged and routed through the base station 104 to other communication devices (e.g., another UE (not shown)). The base station 104 can be located at the edge of a wire-line portion and the wireless portion of the communication network.

In an aspect, the base station 104 can be associated (e.g., connected directly, or indirectly via a radio network controller (RNC)) with an access network 106, such as a wire-line access network, which can be in the wire-line portion of the communication network and can facilitate serving a wireless service provider(s) associated with the communication network by facilitating connecting subscribers (e.g., using UE(s) 102) with the wireless service provider(s). The access network 106 can comprise components, such as routers, nodes, switches, interfaces, controllers, etc., that can facilitate communication of data between communication devices in the communication network. In another aspect, the access network 106 can be associated with a core network 108, which can be in the wire-line portion of the communication network, and can facilitate routing data between communication devices, such as UEs 102, allocating resources to UEs 102 in the network, converting or enforcing protocols, establishing and enforcing Quality of Service (QoS) for UEs 102, providing applications or services in the network, translating signals, and/or performing other functions to facilitate system interoperability and communication in the wireless communication network. The core network 108 can comprise gateways, routers, nodes, switches, interfaces, controllers, etc., to facilitate communication between communication devices (e.g., UEs 102) associated with the network.

Conventionally, in a wireless communication network, when communication devices are communicating via an internet connection, each communication device is assigned a respective internet protocol (IP) address, which can be utilized by the communication network to route data traffic to or from the communication device associated with the IP address. An IP (e.g., IPv6, IPv4) typically can comprise header information (e.g., version, traffic class, flow label, payload length, next header, hop limit, source IP address, destination IP address, etc.), where the source IP address identifies the source communication device transmitting the data packet, and the destination IP address identifies the destination communication device that is to receive the data packet, and where each of these various parameters can have a specified number of bits (e.g., source IP address and destination IP address each can be 128 bits for IPv6). Conventionally, communication devices and associated data traffic are susceptible to a number of different types of attacks by hackers. One common type of security attack is known as "spoofing", where a hacker replaces IP address information in a data packet with fake information, such as a fake IP address, so that a communication device and associated user that receives the data packet mistakenly believes that the data packet came from another source, where the other source may be a trusted source in relation to the user. In wireless communication, a hacker may be able to obtain a conventional IP address associated with a wireless communication device and use it to spoof communication devices and associated communication device users thereby breaching the security of the data communications of these users.

In contrast to conventional systems and techniques, the subject application can dynamically incorporate a value, which can indicate a current physical location of a UE, such as UE 102 (e.g., value can be a physical location geo-spatial co-ordinate associated with the UE), as part of the IP address associated with the UE to facilitate dynamically controlling (e.g., managing) routing of data traffic associated with or at least ostensibly associated with the UE and securing data communications between the UE and other communication devices, such as UE 110 or UE 112, when communicating on the internet 114 (e.g., via an internet connection). UE 110 can be connected (e.g., wirelessly connected) to base station 104 or a different base station (not shown) to communicate and connect to the internet 114 (and communication devices associated therewith) in the communication network, and UE 112 can be connected (e.g., wirelessly connected) to the access network 106 via an access point (AP) 118 that employs a desired wireless technology (e.g., Wi-Fi, WiMAX, etc.) to facilitate connecting the UE 112 to the internet 114. In an aspect, the core network 108 can comprise an IP management component 116 that can monitor communications between UEs (e.g., 102, 110, 112) and other communication devices and respective physical locations of respective UEs in the communication network. The IP management component 116 can dynamically obtain current physical location information (e.g., global positioning system (GPS) information) relating to the current physical location of UE 102 and can dynamically incorporate a current physical location value (e.g., current physical location geo-spatial co-ordinate) that corresponds to the current physical location of the UE 202 as part of the IP address of the UE 102 to prevent undesired intrusions by hackers, as communications associated with the UE 102 will be routed to/from the UE 102 at the current physical location. In another aspect, to facilitate incorporating or integrating the current physical location value with the IP address, the IP management component 116 can translate the IP address as a function of the current physical location value to modify the IP address (e.g., the N-bit IP address can be modified so that the N-bits have a different value based at least in part on the current physical location value and/or a true or pseudo randomly generated number). The modified IP address can be mapped to the current physical location value, original IP address, and/or other information (e.g., randomly generated number; associated other desired physical location values, for example, corresponding to defined physical location spaces that are near, adjacent to or proximate to the defined physical location space represented by the current physical location value, such as more fully disclosed herein) associated with the UE 102, and the current physical location value, original IP address, modified IP address, other information, and/or associated mapping relating to the UE 102 can be stored in a data store (not shown in FIG. 1) (e.g., stored in a translation table stored in the data store) associated with the IP management component 116.

When data traffic is transmitted from the UE 102 to another communication device, the IP management component 116, which can monitor communications of UEs, can detect (e.g., automatically detect) the data traffic associated with the UE 102 (or at least ostensibly associated with the UE 102), and can identify the source IP address of the data traffic as the same IP address as that associated with the UE 102 by referencing the modified IP address in the translation table (e.g., the source IP address of the data traffic can have the same parameter value as the modified IP address associated with the UE 102). The IP management component 116 can retrieve the modified IP address, current physical location value and/or other information associated with the UE 102 from the translation table. The IP management component 116 also can obtain and/or determine the current physical location, and thereby determine the current physical location value, associated with the UE 102. The IP management component 116 can compare the determined current physical location value associated with the UE 102 with the stored current physical location value associated with the UE 102 to determine whether the respective values are the same. If the respective values are the same, the IP management component 116 can determine that the data traffic is actually being sent from the UE 102, and the data traffic can be dynamically routed to the desired destination, such as another communication device in the communication network.

When data traffic is transmitted to the UE 102 from another communication device, the IP management component 116 can detect the data traffic associated with the UE 102 (or at least ostensibly associated with the UE 102), and can identify the destination IP address of the data traffic as the same IP address as that associated with the UE 102 by referencing the modified IP address in the translation table (e.g., the destination IP address of the data traffic can have the same parameter value as the modified IP address associated with the UE 102). The IP management component 116 can retrieve the modified IP address, current physical location value and/or other information associated with the UE 102 from the translation table. The IP management component 116 also can obtain and/or determine the current physical location, and thereby determine the current physical location value, associated with the UE 102. The IP management component 116 can compare the determined current physical location value associated with the UE 102 with the stored current physical location value associated with the UE 102 to determine whether the respective values are the same. If the respective values are the same, the IP management component 116 can determine that the data traffic is actually being sent to the intended destination, the UE 102, and the data traffic can be dynamically routed to the UE 102.

If and when a hacker uses a communication device to attempt to hack into data traffic associated with the UE 102 and/or have the hacker's communication device pose as if it is the UE 102 (e.g., spoof), for example, by representing the IP address for a communication from the hacker's communication device as the IP address of the UE 102 (e.g., modified IP address associated with the UE 102), the IP management component 116 can detect the data traffic that is represented as being associated with the UE 102 and can identify the source IP address or destination IP address (whichever of the source communication device or destination communication device that is representing itself to be the UE 102) of the data traffic as the same IP address as that associated with the UE 102 by referencing the modified IP address associated with the UE 102 in the translation table (e.g., the source IP address or destination IP address (whichever is applicable) of the data traffic can have the same parameter value as the modified IP address associated with the UE 102).

The IP management component 116 can retrieve the modified IP address, current physical location value, and/or other information (e.g., randomly generated number) associated with the UE 102 from the translation table. The IP management component 116 also can obtain and/or determine the current physical location information (and thereby obtain and/or determine the current physical location value), if any, associated with the hacker's communication device. The IP management component 116 can compare the determined current physical location value (associated with the hacker's communication device), if any, to the stored current physical location value (associated with the UE 102), and can determine that the data traffic is not associated with the UE 102, since the respective physical location values for the UE 102 and the hacker's communication device will be different. The IP management component 116 can discard the data traffic associated with the hacker's communication device or can dynamically route the data traffic to a different destination than the destination IP address provided in the data traffic in order to prevent the undesired intrusion by the hacker's communication device and secure the UE 102 and any other communication device(s) that the hacker is attempting to attack using the IP address of the UE 102. In another aspect, the IP management component 116 also can flag the hacker's communication device as a security problem and can attempt to identify the hacker's communication device (e.g., monitor communications associated with the hacker's communication device, monitor the physical location(s) of the hacker's communication device, etc.) in order to identify the hacker.

In accordance with an aspect, the IP management component 116 can comprise search functionality and can search for IP addresses (e.g., modified IP addresses) that are respectively associated with UEs (e.g., 102, 110, 112) in a defined location space or area (e.g., physical or geographic location) for a communication network. For each defined location space or area in the communication network, the IP management component 116 can generate, maintain, and/or monitor a list of IP addresses respectively associated with UEs that are detected to be physically in the defined location space or area (e.g., as desired, two-dimensional location space or three-dimensional location space, which can be defined by two or more of latitudinal co-ordinate (or a range of latitudinal co-ordinates), longitudinal co-ordinate (or a range of longitudinal co-ordinates), and/or altitudinal co-ordinate (or a range of altitudinal co-ordinates), as desired) on the communication network. When data traffic that is ostensibly associated with a modified IP address of a UE is detected, the IP management component can reference the associated modified IP address in the particular list of IP addresses that contains the modified IP address to determine the defined physical location associated with that particular list of IP addresses, and can determine the current physical location and corresponding current physical location value of the UE(s) associated with the data traffic. If the current physical location value for the UE associated with the detected data traffic is not the same as the physical location value or within the range of physical location values associated with the defined location space, the IP management component 116 can prevent access to the communication network (e.g., prevent the data traffic from being communicated to the destination UE; discard the data traffic associated with the UE that is having its access prevented; or another desired action). If the current physical location value for the UE associated with the detected data traffic is the same as the physical location value or is within the range of physical location values associated with the defined location space, the IP management component 116 can allow access to the communication network (e.g., the data traffic can be communicated to the destination communication device).

In another aspect, if and when the UE 102 moves to a new physical location, the IP management component 116 can dynamically obtain new physical location information identifying the new current physical location of the UE 102, can determine and/or obtain a new current physical location value (e.g., new current physical location geo-spatial coordinate), and can dynamically perform a new IP address modification to modify the IP address to incorporate the new physical location value associated with the UE 102. For example, the IP management component 116 can translate the original IP address using the new current physical location value and/or a true or pseudo randomly generated number to modify the original IP address to incorporate the new current physical location value as part of the IP. The new modified IP address, new current physical location value, and original IP address, and/or other information (e.g., randomly generated number) can be mapped to each other. The new modified IP address, new current physical location value, associated mapping, and/or other information can be stored in the translation table.

In yet another aspect, the IP management component 116 can define a physical location to a desired predefined level of granularity (e.g., a desired amount of physical location space in two or three dimensions). Thus, the IP management component 116 can represent a predefined amount of two-dimensional or three-dimensional physical location space by a corresponding physical location value, and a UE (e.g., 102, 110, 112) that is operating (e.g., transmitting or receiving data) within the predefined two-dimensional or three-dimensional physical location space can be associated with the physical location value associated with such physical location space and can continue to be associated with such physical location space and corresponding physical location value so long as that UE is physically located within such physical location space. As a result, the subject application can maintain a desired balance between the level of security with regard to data communications in the communication network with the amount of overhead relating to maintaining and updating physical location values for UEs in the communication network. For instance, a physical location value can be associated with a predefined amount of two-dimensional or three-dimensional physical location space at a desired level of granularity such that a desired level of security is maintained for data communications (e.g., the risk that a hacker's communication device will be within the same defined physical location space as a communication device being attacked by the hacker is relatively minimal), and the UE can be moved around within such physical location space without triggering a re-modification of the IP address (e.g., a new modified IP address) due to moving the UE around to another physical location when it is still within such physical location space associated with the physical location value, where performing such a re-modification can result in a certain amount of overhead.

Alternatively, or in addition to, specifying or defining a physical location to a desired predefined level of granularity, the IP management component 116 can determine whether to automatically or dynamically trigger re-modification of a modified IP address associated with a UE (e.g., 102) based at least in part on the amount of distance a UE is from the defined physical location space associated with the current physical value. The IP management component 116 can detect data traffic ostensibly associated with a UE (e.g., 102) (and associated modified IP address) and can identify (e.g., detect, determine, or receive information regarding, etc.) the current physical location of the UE and/or associated current physical location value of the UE that is the source or destination UE associated with the data traffic. The IP management component 116 can determine whether the current physical location value associated with the source and/or destination UE for such data traffic is a value that is associated with a physical location that is within a predefined distance of the physical location associated with the current physical location value relating to the modified IP address (e.g., the physical location value associated with the source or destination UE corresponds to a physical location that is within a predefined distance of the physical location corresponding to the current physical location associated with the modified IP address), in accordance with a specified predefined IP rule.

If the source or destination UE (whichever is being evaluated) is at or within a predefined distance of the physical location associated with the current physical location value relating to the modified IP address, the IP management component 116 can determine that the source or destination UE (whichever is being evaluated) is actually the UE associated with the source or destination address (whichever is applicable) of the data traffic, and can route the data traffic to the desired destination, as specified in the header of the data packet(s). If the source or destination UE (whichever is being evaluated) is not at or within a predefined distance of the physical location associated with the current physical location value relating to the modified IP address, the IP management component 116 can determine that the source or destination UE (whichever is being evaluated) is not the UE associated with the source or destination address (whichever is applicable) of the data traffic, but rather is an imposter UE or at least a suspected imposter UE, and can route the data traffic to the desired destination that is not the destination specified in the data traffic, can flag the data traffic as a security issue, can discard the data traffic, and/or can take other desired action.

As a result, even though the UE may not be in the physical location associated with the current physical location value, but rather is at least within a predefined distance of the location associated with the current location value, the IP management component 116 can determine that the UE is the desired UE and not an imposter UE given the proximity of the UE to the location associated with the current location value. Thus, the data traffic can be desirably routed, a re-modification of the IP address of the UE can be avoided, which can reduce or eliminate the resources necessary for re-modification of the IP address, while security of the data traffic and communication devices can be desirably and efficiently maintained.

In yet another aspect, alternatively, or in addition to, specifying or defining a physical location to a desired predefined level of granularity, the IP management component 116 can determine whether to automatically or dynamically trigger re-modification of a modified IP address associated with a UE (e.g., 102) based at least in part on whether a UE is located in the defined physical location space associated with the current physical value or another defined physical location space associated with another current physical value that is associated with the current physical location value (e.g., in accordance with a predefined IP rule) or not. The IP management component 116 can detect (e.g., automatically detect) a current physical location of a UE (e.g., 102) and can generate or obtain (e.g., automatically generate or obtain) a current physical location value that corresponds to the current physical location of the UE and corresponds to the defined physical location space in which the current physical location is situated, where the physical location space can be defined to the desired predefined level of granularity. The IP management component 116 can incorporate or integrate the current physical location value into or as part of the IP address associated with the UE to generate a modified address for the UE. The IP management component 116 also can associate other desired physical location values, such as physical location values that are respectively associated with defined physical location spaces that are near, adjacent to, or proximate to (e.g., within a predefined distance from) the defined physical location space wherein the current physical location of the UE is located. The IP address, modified IP address, current physical location value, other desired physical location values to be associated with the current physical location value, and/or other information (e.g., randomly generated number) can be mapped to or associated with each other and stored in the translation table.

When the IP management component 116 detects data traffic ostensibly associated with a UE (e.g., 102) (and associated modified IP address), the IP management component 116 can identify (e.g., automatically detect, determine, or receive information regarding, etc.) the current physical location of the UE and/or associated current physical location value of the UE that is the source or destination UE (whichever is applicable) associated with the data traffic. Using the IP address (e.g., source IP address, destination IP address, as applicable with respect to the UE being evaluated) provided in the data traffic, the IP management component 116 reference information relating to that IP address in the translation table, where such information can comprise the current physical location value, other desired physical location values (e.g., corresponding to defined physical location spaces that are near, adjacent to, or proximate to the defined physical location space relating to the current physical location value of the UE) associated with the current physical location value, the modified IP address, and/or other desired information (e.g., randomly generated number). The IP management component 116 can evaluate (e.g., compare) the identified physical location value of the source or destination UE (whichever is being evaluated) to determine whether it matches the current physical location value of the UE or other desired physical locations values associated therewith, in accordance with another specified predefined IP rule. If the IP management component 116 determines that the identified physical location value of the source or destination UE (whichever is being evaluated) matches either the current physical location value or any one of the other desired physical location values associated therewith, the IP management component 116 can determine that the source or destination UE (whichever is being evaluated) is actually the UE associated with the source or destination address (whichever is applicable) of the data traffic and thus the modified IP address, and can route the data traffic to the desired destination, as specified in the header of the data packet(s).

If the IP management component 116 determines that the identified physical location value of the source or destination UE (whichever is applicable) does not match the current physical location value or any of the other desired physical location values associated therewith, the IP management component 116 can determine that the source or destination UE (whichever is being evaluated) is not the UE associated with the source or destination address (whichever is applicable) of the data traffic, but rather is an imposter UE or at least a suspected imposter UE, and can route the data traffic to the desired destination that is not the destination specified in the data traffic, can flag the data traffic as a security issue, can discard the data traffic, and/or can take other desired action.

As a result, even though the UE may not be in the defined physical location space associated with the current physical location value, but rather is in a defined physical location space that is near, adjacent to or proximate to the defined physical location space associated with the current physical location value, the IP management component 116 can determine that the UE is the desired UE and not an imposter UE given the proximity of the UE to the defined physical location space associated with the current location value. Thus, the data traffic can be desirably routed, unnecessary or undesired re-modification of the IP address of the UE can be avoided, which can reduce or eliminate the resources necessary for re-modification of the IP address, while security of the data traffic and communication devices can be desirably and efficiently maintained.

In accordance with an embodiment, optionally, as desired, the IP management component 116 can generate and/or obtain true or pseudo randomly generated numbers, which can be utilized in conjunction with a current physical location value to translate an original IP address associated with a UE (e.g., 102) to facilitate securing data communications between the UE and other communication devices from hackers. The randomly generated number associated with an IP address of a UE can be stored in the translation table and mapped to the original IP address of the UE along with the current physical location value.

In still another aspect, the IP management component 116 can employ one or more desired predefined IP rules that correspond to predefined IP criteria, and relate to and facilitate incorporating a physical location value as part of an IP address associated with a UE (e.g., 102), determining whether to automatically trigger a modification (or re-modification) of a modified IP address, determining whether a particular UE is an actual UE as represented by the modified IP address or an imposter UE masquerading as the actual UE, determining how to route data traffic, etc.

It is to be appreciated and understood that the subject application is depicted in FIG. 1 as having UE 102 and UE 110 communicating wirelessly via the base station 104 and UE 112 is depicted as being connected to the access network via AP 118. The base station 104 and AP 118 can facilitate wireless communication and UE 102, UE 110, and/or UE 112 can be connected and can communicate wirelessly using virtually any desired wireless technology, including, for example, cellular, Wi-Fi, Wi-Max, wireless local area networks (WLAN), etc.

It is to be further appreciated and understood that the subject application is depicted in FIG. 1 as having three UEs (e.g., 102, 110, 112), one base station 104, one IP management component 116, and one AP 118; however, the subject application is not so limited, as there also can be less than three UEs, three UEs, or more than three UEs, more than one base station 104, more than one IP management component 116, and/or more than one AP 118, as desired. It is to be further appreciated and understood that, while the IP management component 116 is depicted as being within the core network 108, the subject application is not so limited, as, in accordance with various embodiments, the IP management component 116 can be a stand-alone unit, the IP management component 116 can be part of another component in system 100, or portions (e.g., components) of the IP management component 116 can be distributed as separate components throughout the system 100, as desired. It is to be appreciated and understood that, while the subject application is described in terms of UEs connecting to the internet (and communicating with other communication devices associated with the internet), the subject application is not so limited, as the subject application also can be employed to facilitate data communication via an intranet, databases, etc., or any combination thereof.

In accordance with one embodiment of the subject application, one or more components (e.g., IP management component 116) in the communication network can utilize artificial intelligence (AI) methods to infer (e.g., reason and draw a conclusion based at least in part on a set of metrics, arguments, or known outcomes in controlled scenarios) a physical location of a UE; whether a UE has moved to a new physical location; whether a data communication is associated with a desired UE or a communication device associated with a hacker; etc. Artificial intelligence techniques typically can apply advanced mathematical algorithms—e.g., decision trees, neural networks, regression analysis, principal component analysis (PCA) for feature and pattern extraction, cluster analysis, genetic algorithm, and reinforced learning—to historic and/or current data associated with system 100 (or another system(s) disclosed herein) to facilitate rendering an inference(s) related to the system 100 (or another system(s) disclosed herein).

In particular, the one or more components in the network can employ one of numerous methodologies for learning from data and then drawing inferences from the models so constructed, e.g., Hidden Markov Models (HMMs) and related prototypical dependency models. General probabilistic graphical models, such as Dempster-Shafer networks and Bayesian networks like those created by structure search using a Bayesian model score or approximation can also be utilized. In addition, linear classifiers, such as support vector machines (SVMs), non-linear classifiers like methods referred to as "neural network" methodologies, fuzzy logic methodologies can also be employed. Moreover, game theoretic models (e.g., game trees, game matrices, pure and mixed strategies, utility algorithms, Nash equilibria, evolutionary game theory, etc.) and other approaches that perform data fusion, etc., can be exploited in accordance with implementing various automated aspects described herein. The foregoing methods can be applied to analysis of the historic and/or current data associated with system 100 (or another system(s) disclosed herein) to facilitate making inferences or determinations related to system 100 (or another system(s) disclosed herein).

Figure 2:
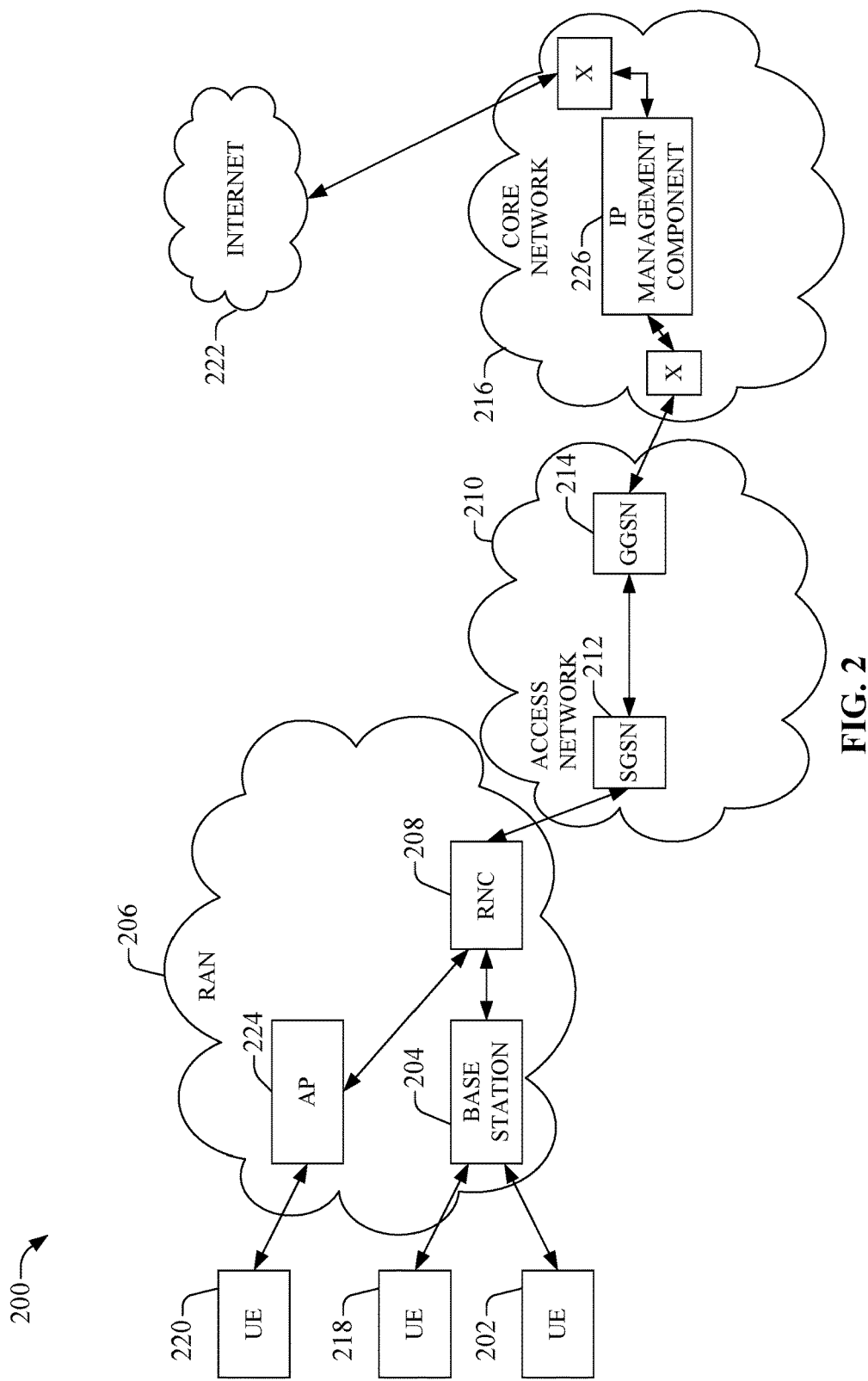
FIG. 2 is a block diagram of an example system that can incorporate a physical location value in an IP address associated with a communication device in a communication network in accordance with another embodiment of the disclosed subject matter.

FIG. 2 is a block diagram of an example system 200 that can incorporate a physical location value in an IP address associated with a communication device (e.g., UE) in a communication network in accordance with another embodiment of the disclosed subject matter. The example system 200 can comprise a UE 202 (e.g., mobile and/or wireless communication device, such as a mobile phone, PDA, computer, IPTV, gaming console, set-top box, printer, etc.) in a communication environment. In an aspect, the UE 202 can be located in the wireless portion (e.g., region) of the communication network, for example. The UE 202 can be connected (e.g., wirelessly connected) to a base station 204 to facilitate communication in the wireless communication environment. The base station 204 can serve a coverage macro cell that can cover a specified area, and the base station 204 can service wireless devices (e.g., wireless mobile devices), such as UE 202, in the area covered by the macro cell, where such coverage can be achieved via a wireless link (e.g., UL, DL). When an attachment attempt is successful, UE 202 can be served by base station 204 and incoming voice and data traffic can be paged and routed to the UE 202 through the base station 204, and outgoing voice and data traffic from the UE 202 can be paged and routed through the base station 204 to other communication devices (e.g., another UE). The base station 204 can be located at the edge of a wire-line portion and the wireless portion of the communication network, for example.

In an aspect, the system 200 can include a radio access network (RAN) 206, such as a high-speed packet access (HSPA) RAN, that can be utilized to facilitate communication between communication devices, such as the UE 202, associated with or in the wireless portion of the network. The base station 204 can be in or associated with the RAN 206. The RAN 206 also can contain a radio network controller (RNC) 208 that can facilitate controlling routing of data between the base station 204 (or other base stations in or associated with the RAN 206) and an access network 210 (e.g., a wire-line access network). For instance, as desired, there can be one or more RNCs 208 in the communication network (e.g., an RNC 208 for each cell in the communication network).

The access network 210 can be in the wire-line portion of the communication network and can facilitate serving a wireless service provider(s) associated with the communication network by facilitating connecting subscribers (e.g., using UE(s) 202) with the wireless service provider(s). The access network 210 can include a serving support node, such as a serving GPRS support node (SGSN) 212, which can be associated with the RNC 208 to facilitate communication of data, in accordance with specified protocols, between the RAN 206 and access network 210. The access network 210 can contain a gateway node, such as a gateway GPRS support node (GGSN) 214, that can facilitate communication of data between the access network 210 and a core network 216. The access network 210 also can comprise other components, such as routers, nodes, switches, interfaces, controllers, etc., that can facilitate communication of data between communication devices in the communication network.

The core network 216 also can be in the wire-line portion of the communication network and can facilitate routing data between communication devices, such as UE 202, UE 218 (which can be connected to the base station 204), and/or UE 220, allocating respective resources for respective UEs in the communication network, establishing and enforcing respective QoS for the respective UEs, providing applications or services in the communication network, etc. The core network 216 also can comprise gateways, routers, nodes, switches, interfaces, controllers, etc., to facilitate communication between communication devices (e.g., UE 202) associated with the communication network. In an aspect, the core network 216 can be associated with the internet 222 to facilitate enabling communication devices, such as UE 202 and UE 218 to connect to the internet 222. In another aspect, UE 220 can be connected to the access network 210 via an AP 224 that employs a desired wireless technology (e.g., Wi-Fi, Wi-MAX, etc.).

In accordance with an aspect, the system 200 can comprise an IP management component 226 that can monitor communications between UEs (e.g., 202, 218, 220) and/or other communication devices and respective physical locations (e.g., using GPS) of respective UEs in the communication network. The IP management component 226 can dynamically obtain current physical location information (e.g., GPS information) relating to the current physical location of a UE (e.g., 202) and can dynamically incorporate a current physical location value (e.g., current physical location geo-spatial co-ordinate) that corresponds to the current physical location of the UE 202 as part of the IP address of the UE 202 (e.g., translate the IP address based at least in part on the current physical location value) to prevent undesired intrusions by hackers, as communications associated with the UE 202 will be routed to/from the UE 202 at or associated with the current physical location. In an aspect, the IP management component 226 can facilitate routing of data traffic to/from a desired UE (e.g., 202) as, for example, the IP management component 226 can communicate or facilitate communicating routing information relating to the desired UE to the GGSN 214 or other routing components in the core network 216.

In accordance with various aspects, UE 202, base station 204, access network 210, core network 216, UE 218, UE 220, IP management component 226, AP 224, and other components in system 200, respectively can be the same or similar as and/or can comprise the same or similar features and functionality as respectively named components such as more fully described herein, for example, with regard to system 100.

It also is to be appreciated and understood that the subject application is depicted in FIG. 2 as having three UEs 202, 218 and 220, one base station 204, one RNC 208, one SGSN 212, one GGSN 214, one AP 224, and one IP management component 224; however, the subject application is not so limited, as there also can be less than three UEs, three UEs, or more than three UEs, more than one base station 204, more than one RNC 208, more than one SGSN 212, more than one GGSN 214, more than one AP 224, and/or more than one IP management component 226, as desired. It is to be further appreciated and understood that, while the IP management component 226 is shown as being included as part of the core network 216, the subject application is not so limited, as, in accordance with various embodiments, the IP management component 226 can be a stand-alone unit, the IP management component 226 can be part of another component in system 200, or portions (e.g., components) of the IP management component 226 can be distributed as separate components throughout the system 200, as desired.

Figure 3:
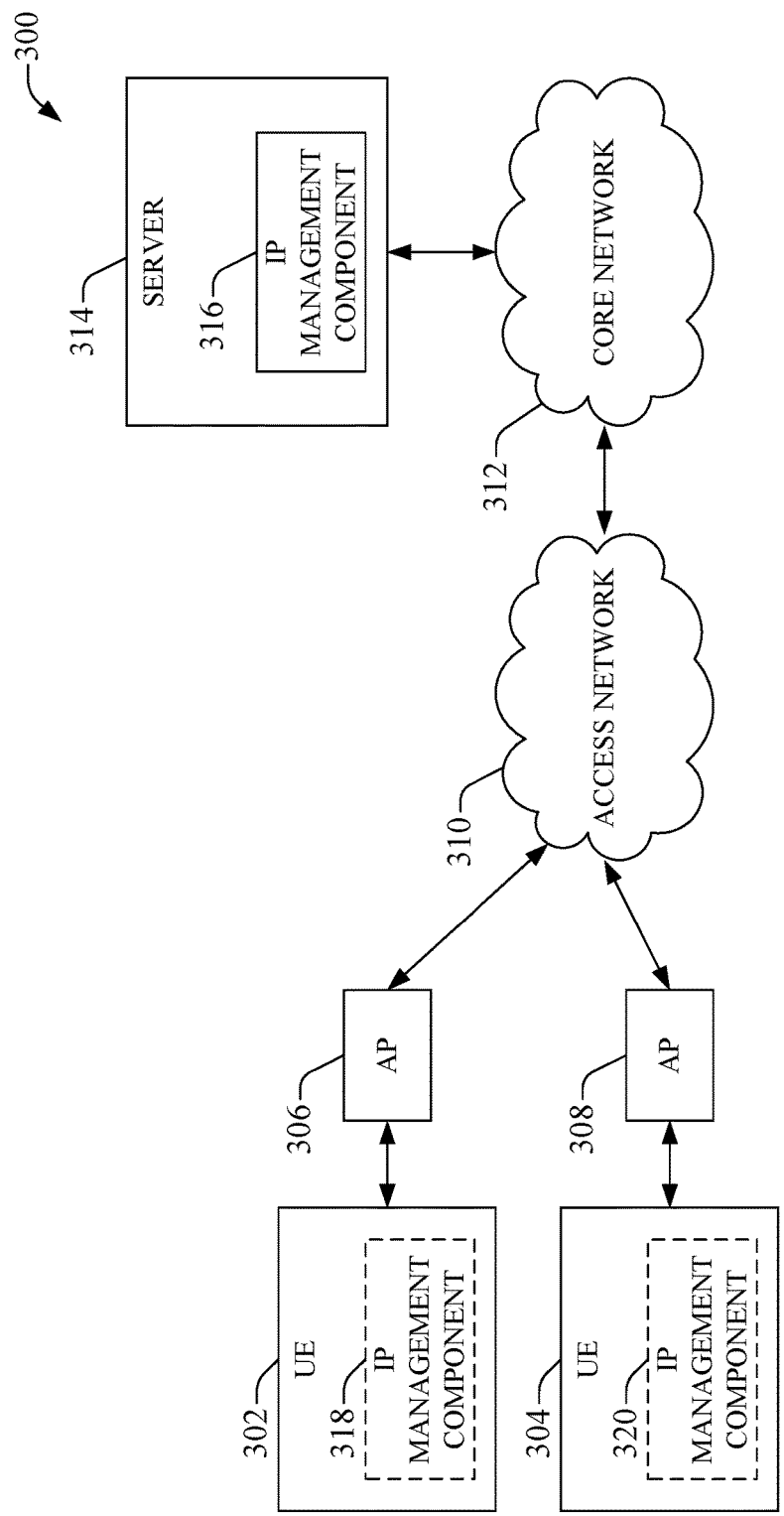
FIG. 3 that can incorporate a physical location value in an IP address associated with a communication device communicating with a server in a communication network in accordance with still another embodiment of the disclosed subject matter.

FIG. 3 depicts a block diagram of an example system 300 that can incorporate a physical location value in an IP address associated with a communication device (e.g., UE) communicating with a server in a communication network in accordance with still another embodiment of the disclosed subject matter. In an aspect, example system 300 can include UEs 302 and 304 (e.g., mobile and/or wireless communication devices, such as a mobile phone, PDA, computer, IPTV, gaming console, set-top box, printer, etc.) in a communication environment. The UEs 302 and 304 can be connected (e.g., wirelessly connected) to respective APs 306 and 308 (e.g., cellular base station(s), Wi-Fi hot spot, etc.) to facilitate communication by the UEs 302 and 304 in the wireless communication environment. The APs 306 and 308 can serve respective coverage cells that can cover a specified area, and the respective APs 306 and 308 can service mobile wireless devices, such as UEs 302 and 304, in the area covered by the respective cells, where such coverage can be achieved via a wireless link (e.g., UL, DL). When an attachment attempt is successful, UE 302 can be served by AP 306 and incoming voice and data traffic can be paged and routed to the UE 302 through the AP 306, and outgoing voice and data traffic from the UE 302 can be paged and routed through the AP 306 to other communication devices (e.g., another UE). Similarly, with regard to UE 304, when an attachment attempt is successful, UE 304 can be served by AP 308 and incoming voice and data traffic can be paged and routed to the UE 304 through the AP 308, and outgoing voice and data traffic from the UE 304 can be paged and routed through the AP 308 to other communication devices (e.g., another UE).

In an aspect, the APs 306 and 308 can be associated (e.g., connected directly, or indirectly via a radio network controller (RNC)) with an access network 310 that can facilitate serving a wireless service provider(s) associated with the communication network by facilitating connecting subscribers (e.g., using UEs 302 and 304) with the wireless service provider(s). The access network 310 can comprise components, such as routers, nodes, switches, interfaces, controllers, etc., that can facilitate communication of data between communication devices in the communication network. In another aspect, the access network 310 can be associated with a core network 312 that can facilitate routing data between communication devices, such as UEs (e.g., 302, 304), allocating resources to UEs in the network, converting or enforcing protocols, establishing and enforcing QoS for UEs, providing applications or services in the network, translating signals, and/or performing other functions to facilitate system interoperability and communication in the wireless communication network. The core network 312 can comprise gateways, routers, nodes, switches, interfaces, controllers, etc., to facilitate communication between communication devices associated with the communication network.

In still another aspect, the core network 312 can be associated with a server 314 to facilitate data communication between the server 314 and UEs 302 and 304. The server 314 can process and store data, and can receive data from communication devices, such as UEs 302 and 304, and can transmit data to the communication devices.

In another aspect, the server 314 can include an IP management component 316 that can monitor communications associated with UEs, such as UEs 302 and 304, and/or other communication devices and respective physical locations (e.g., using GPS) of respective UEs in the communication network. The IP management component 316 can dynamically obtain current physical location information (e.g., GPS information) relating to the current physical location of a UE (e.g., 302, 304) and can dynamically incorporate a current physical location value (e.g., current physical location geo-spatial co-ordinate) that corresponds to the current physical location of the UE (e.g., 302, 304) as part of the IP address of the UE (e.g., translate the IP address based at least in part on the current physical location value and/or a true or pseudo randomly generated number) to prevent undesired intrusions by hackers, as communications associated with the UE will be routed to/from the UE at or associated with the current physical location. In an aspect, the IP management component 316 can facilitate routing of data traffic to/from a desired UE as, for example, the IP management component 316 can communicate or facilitate communicating routing information relating to the desired UE to routing components (not shown) associated with the server 314.

For instance, the server 314 can detect data traffic from a UE, such as UE 302, or a device representing itself as the UE 302 using the modified IP address associated with the UE 302. The actual UE 302 can be associated with a particular physical location that can be represented by a corresponding current physical location value, which along with an associated modified IP address, original IP address, other desired information, and/or associated mapping can be stored in a translation table associated with the IP management component 316. The IP management component 316 can automatically obtain current physical location information and/or a corresponding current physical location value of the device that is representing itself as the UE 302 and is associated with the data traffic. The IP management component 316 can reference information relating to the actual UE 302 using the modified IP address provided with the data traffic, and can retrieve a current physical location value associated with the actual UE 302 and/or other information from the translation table. The IP management component 316 can compare the retrieved current physical location value, which is known to correspond to the current physical location of the actual UE 302, to the obtained current physical location value of the device that is representing itself as the UE 302 with regard to the data traffic to determine whether the respective current physical location values match each other.

If the respective current physical location values match each other, the IP management component 316 can determine that the device representing itself to be the UE 302 is actually the UE 302, and can facilitate automatically routing (e.g., by automatically generating and communicating routing information to a router component) the data traffic as specified in the header information of the data traffic (e.g., route data traffic to the specified destination). If the respective current physical location values do not match each other, the IP management component 316 can determine that the device representing itself to be the UE 302 is not the UE 302, but rather is masquerading as the UE 302, and can facilitate automatically routing (e.g., by automatically generating and communicating routing information to a router component) the data traffic differently than specified by the data traffic, such as, for example, by routing the data traffic to discard the data traffic, routing the data traffic to a different and secure destination other than the destination specified in the data traffic, etc., and/or can refuse to generate data that is desired by the imposter device (e.g., when imposter device desires information from the server 314, the server 314 can refuse to generate the data desired by the imposter device). The IP management component 316 also can flag the imposter device as a security problem, where action can be taken to attempt to identify the imposter device and associated user (e.g., hacker).

Alternatively, or additionally, in accordance with another aspect, the IP management component 316 can provide different levels of security for information in the server 314 based at least in part on the physical location of the communication device communicating with the server 314. For example, a UE, such as UE 302, can be associated with one or more trusted physical locations (e.g., home of the UE user, place of employment of the UE user, etc.) having respective corresponding current physical location values. If the IP management component 316 obtains the current physical location value of a device representing itself to be the UE 302 and determines that the device is actually the UE 302 and it is at a trusted physical location based at least in part on the current physical location value, the IP management component 316 can allow a specified level of access to the server 314 and information therein that is a higher level of access than the level of access to the server 314 and information therein granted to the UE 302 when the UE 302 is determined to not be in a trusted physical location. As desired, when the IP management component 316 determines that a device representing itself as the UE 302 actually is the UE 302 but the UE 302 is not in a trusted physical location, as determined based at least in part on the current physical location value associated with the UE 302, the IP management component 316 can grant a lower level of access to the server 314 and information therein (as compared to the specified (e.g., higher) level of access that can be granted to the UE 302 when it is in a trusted physical location) and/or the IP management component 314 can request certain and/or additional authentication credentials (e.g., which can be in addition to other authentication credentials, if any, that are to be provided by the UE 302 even when it is in a trusted physical location) be provided by the UE 302 and associated user in order for the UE 302 to be granted a higher level of access to the server 314 and information therein, where such higher level of access can be the same or different (e.g., lower) than the specified level of access granted to the UE 302 when in a trusted physical location.

In accordance with an embodiment, the UEs 302 and 304 optionally can comprise respective IP management components 318 and 320 that each can dynamically incorporate a physical location value as part of an IP address to generate a modified IP address and can dynamically route data traffic, based at least in part on the modified IP address, to facilitate enhanced security with regard to data communications associated with the UEs 302 and 304. In an aspect, a UE, such as UE 302, can desire to communicate securely with the server 314 (e.g., server comprising employment-related information, server comprising user account and/or financial information, mailbox server, phone server, etc.), which can be a server associated with an entity, such as an employer of a user (e.g., user of UE 302), a financial business (e.g., bank, finance company, stock broker, etc.), online service provider or application provider, and/or other entity, for which secure communications can be paramount. The actual server 314 with which communication is desired by the UE 302 can be associated with a particular physical location that can be represented by a corresponding current physical location value, which along with an associated modified IP address, original IP address, other desired information, and/or associated mapping can be stored in a translation table.

When data traffic ostensibly from the server 314 (e.g., data traffic having modified IP address relating to the server 314) is detected by the IP management component 318, the IP management component 318 can automatically obtain current physical location information and/or a corresponding current physical location value of the device that is ostensibly the server 314 and is associated with the data traffic. The IP management component 318 can reference information relating to the actual server 314 using the modified IP address provided with the data traffic, and can retrieve a current physical location value associated with the actual server 314 and/or other information from a translation table. The IP management component 318 can compare the retrieved current physical location value, which is known to correspond to the current physical location of the actual server 314, to the obtained current physical location value of the device that is representing itself as the server 314 with regard to the data traffic to determine whether the respective current physical location values match each other.

If the respective current physical location values match each other, the IP management component 318 can determine that the device representing itself to be the server 314 is actually the server 314, and can facilitate automatically routing (e.g., by automatically generating and communicating routing information to a router component) the data traffic as specified in the header information of the data traffic (e.g., route data traffic to the specified destination). If the respective current physical location values do not match each other, the IP management component 318 can determine that the device representing itself to be the server 314 is not the server 314, but rather is masquerading as the server 314, and can facilitate automatically routing (e.g., by automatically generating and communicating routing information to a router component) the data traffic differently than specified by the data traffic, such as, for example, by routing the data traffic to discard the data traffic, routing the data traffic to a different and secure destination other than the destination specified in the data traffic, etc., and/or can refuse to generate data that is desired by the imposter device (e.g., when imposter device desires information from the UE 302, the UE can refuse to generate the data desired by the imposter device). The IP management component 318 also can flag the imposter device as a security problem, where action can be taken to attempt to identify the imposter device and associated user (e.g., hacker).

It is to be appreciated and understood that the UEs 302 and 304, APs 306 and 308, and IP management components 316, 318 and 320, each can be the same or similar as and/or can comprise the same or similar functionality as respectively named components, such as more fully described herein, for example, in system 100 and system 200. It also is to be appreciated and understood that the subject application is depicted in FIG. 3 as having two UEs 302 and 304, two APs 306 and 308, one server 314, and one IP management component 316 on the server side, and one IP management component per UE; however, the subject application is not so limited, as there also can be less than two UEs, two UEs, or more than two UEs; less than two APs, two APs, or more than two APs; one or more servers, and/or one or more IP management components, as desired. It is to be further appreciated and understood that, while the respective IP management components 316, 318, and 320 are shown as being respectively included as part of the server 314, UE 302, and UE 304, the subject application is not so limited, as, in accordance with various embodiments, one or more of the respective IP management components can be a standalone unit, the respective IP management component(s) can be part of another component in system 300, or portions (e.g., components) of the respective IP management component(s) can be distributed as separate components throughout the system 300, as desired.

Figure 4:
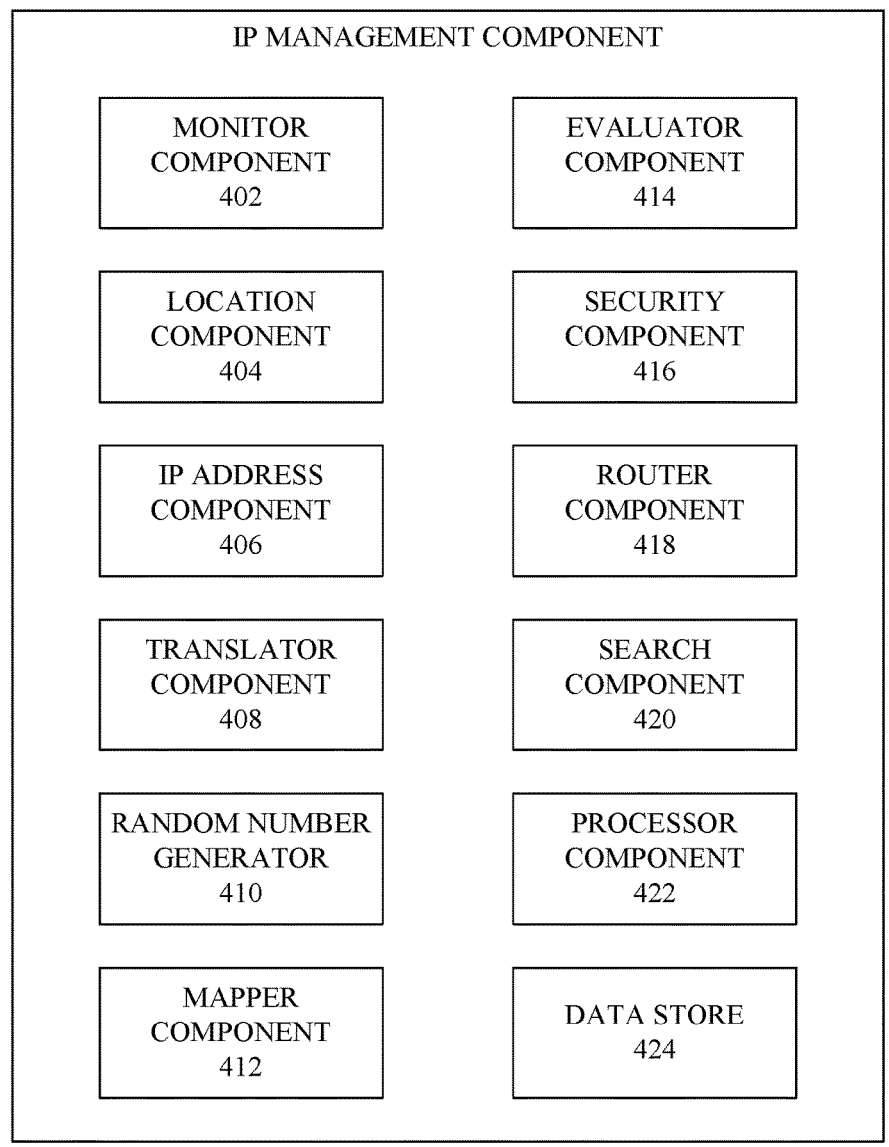
FIG. 4 depicts a block diagram of an example IP management component in accordance with an aspect of the disclosed subject matter.

FIG. 4 depicts a block diagram of an example IP management component 400 in accordance with an aspect of the disclosed subject matter. In an aspect, the IP management component 400 can be utilized to incorporate a physical location value, which corresponds to a physical location of a communication device, in an IP address associated with the communication device (e.g., UE) in a communication network, and controlling routing of data traffic to communication devices based at least in part on the respective modified IP addresses, which incorporate the respective physical location values. The IP management component 400 can include a monitor component 402 that can monitor, detect, and receive respective physical location information associated with respective UEs in the communication, where the physical location information can indicate a physical geographical location of the associated UE. The monitor component 402 also can monitor, detect, and receive information relating to respective IP addresses of respective UEs.

The IP management component 400 also can include a location component 404 that can obtain or receive the physical location information associated with a UE and can determine or identify the current physical location (e.g., physical geographical location) of the UE. The location component 404 also can identify or generate a physical location value (e.g., a physical location geo-spatial coordinate) that can correspond to the current physical location of the UE. In another aspect, the IP management component 400 can contain an IP address component 406 that can identify respective IP addresses associated with respective UEs. The IP address component 406 also can identify modified (e.g., translated) IP addresses of respective UEs.

In still another aspect, the IP management component 400 can comprise a translator component 408 that can translate an IP address associated with a UE, based at least in part on the current physical location value associated with the UE and/or a true or pseudo randomly generated number, to incorporate the current physical location value associated with the UE as part of the IP address associated with the UE to facilitate securing the IP address and the associated UE and/or associated data from attack by unauthorized entities (e.g., hackers). In accordance with an embodiment, as desired, the IP management component 400 can optionally contain a random number generator component 410 that can generate true or pseudo randomly numbers that can be provided to and utilized by the translator component 408 to facilitate translating an IP address associated with a UE to facilitate securing the IP address and the associated UE and/or associated data from attack by unauthorized entities. For example, an IP address associated with a UE can be translated by the translator component 408 as a function of the current physical location value associated with the UE and the randomly generated number.

In yet another aspect, the IP management component 400 can include a mapper component 412 that, for each UE, can generate and maintain a mapping of the original IP address associated with a UE with the modified IP address, the current physical location value, and/or other information (e.g., randomly generated number) associated with the UE. The mapping can be utilized to facilitate ensuring that a data communication to/from a particular UE is actually associated with that particular UE and not another communication device masquerading as the UE.

The IP management component 400 also can comprise an evaluator component 414 that can evaluate or compare the IP address(es) (e.g., modified IP address(es)) associated with a data packet(s) and the respective physical locations of the source UE and/or destination UE associated with the data transmission to facilitate determining whether the data packet(s) is being sent from a source UE that is actually the UE the source UE is representing itself to be by the source IP address and/or determining whether the data packet(s) is being sent to a destination UE that is actually the UE the destination UE is representing itself to be by the destination IP address. The evaluator component 414 can retrieve the IP address, modified IP address, current physical location value, and/or associated mapping (e.g., from the data store 422) that relate to the respective IP addresses as represented by the source UE and/or destination UE associated with the data transmission; and can receive, from the location component 404, the respective current physical locations or corresponding respective current physical location values of the source UE and destination UE. The evaluator component 414 can compare the represented IP address and current physical location value of the source UE (or destination UE, as applicable) to the stored IP address and associated current physical location value to determine whether there is a match. If current physical location value associated with the represented IP address of the source UE (or destination UE, as applicable) matches the current physical location value associated with the IP address that is assigned to the UE that is physically currently located at the physical geographical location (corresponding to its current physical location value), the evaluator component 414 can determine that the source UE (or destination UE, as applicable) is the actual UE associated with the IP address and not an imposter UE attempting masquerade as the actual UE.

In another aspect, the IP management component 400 can include a security component 416 that can enforce predefined IP rules (e.g., comprising predefined security rules) relating to routing of data communications to/from UEs. For example, a predefined security rule can specify that data traffic associated with a particular UE can only be communicated to the UE (or from the UE to another communication device) having an IP address and a current physical location value associated with the particular UE, where the current physical location value can be incorporated in the IP address (e.g., modified or translated IP address). The security component 416 can facilitate ensuring that data communication related to the particular UE is not sent to a UE (e.g., UE masquerading as the particular UE) (or is not sent from a UE to another communication device) when the UE does not have the correct IP address and current physical location value associated with the particular UE.

In still another aspect, the IP management component 400 can contain a router component 418 that can generate routing control information that can be sent to a desired router(s) and utilized to facilitate routing data traffic to desired UEs in accordance with the evaluations by the evaluator component 414 and the predefined IP rules associated with the security component 416.

In an aspect, the IP management component 400 can include a search component 420 that can search for IP addresses (e.g., modified IP addresses) that are respectively associated with UEs in a defined location space or area (e.g., physical or geographic location, which is two-dimensional or three-dimensional) for a communication network. When data traffic that is ostensibly associated with a modified IP address of a UE is detected, the search component 420 can search to identify a list of IP addresses that contains the modified IP address to facilitate determining the defined physical location associated with that particular list of IP addresses, and the location component 404 can determine the current physical location and corresponding current physical location value of the UE(s) associated with the data traffic. The evaluator component 414 can evaluate or compare the physical location value associated with the particular list of IP addresses to/with the current physical location value associated with the data traffic (e.g. associated with the source of destination UE) to determine whether the physical location value of the list matches the current physical location value associated with the data traffic, where a match can result in the data traffic being routed to the desired destination and a non-match can result in the data traffic being discarded and/or routed differently so that the data traffic is not routed to the intended destination as specified in the data packet(s) (e.g., access to the communication network can be denied to the source or destination UE that is determined to not be the UE it is attempting to represent itself to be).

In yet another aspect, the IP management component 400 can comprise a processor component 422 that can work in conjunction with the other components (e.g., monitor component 402, location component 404, IP address component 406, etc.) to facilitate performing the various functions of the IP management component 400. The processor component 422 can employ one or more processors, microprocessors, or controllers that can process data, such as IP address data, physical location information associated with UEs, randomly generated numbers, predefined IP rules, and/or other information, to facilitate incorporating a current physical location (e.g., corresponding current physical location value) as part of an IP address associated with a UE, and determining whether a source UE or destination UE associated with a data transmission is/are actually the source UE or destination UE that they are representing themselves to be based at least in part on the IP addresses they provided and their respective current physical location values; and can control data flow between the IP management component 400 and other components (e.g., monitor component 402, location component 404, IP address component 406, etc.; routers) associated with the IP management component 400 (e.g., contained within the IP management component 400 or outside the IP management component 400).

The IP management component 400 also can include a data store 424 that can store data structures (e.g., user data, metadata); code structure(s) (e.g., modules, objects, classes, procedures) or instructions; physical location information or physical location values respectively associated with UEs and associated IP addresses; mappings respectively associated with IP addresses of UEs; respective modified IP addresses associated with respective UEs; predefined IP rules; network or device information like policies and specifications, attachment protocols; code sequences for scrambling, spreading and pilot (e.g., reference signal(s)) transmission; frequency offsets; cell IDs; and so on. In an aspect, the processor component 422 can be functionally coupled (e.g., through a memory bus) to the data store 424 in order to store and retrieve information (e.g., current physical location value, IP address, modified IP address, associated mapping, relating to a UE; algorithms used to determine whether a source UE or destination UE associated with a data transmission is/are actually the source UE or destination UE that they are representing themselves to be based at least in part on the IP addresses they provided and their respective current physical location values, etc.) desired to operate and/or confer functionality, at least in part, to monitor component 402, location component 404, IP address component 406, translator component 408, random number generator 410, mapper component 412, evaluator component 414, security component 416, router component 418, search component 420, and/or substantially any other operational aspects of the IP management component 400.

Figure 5:
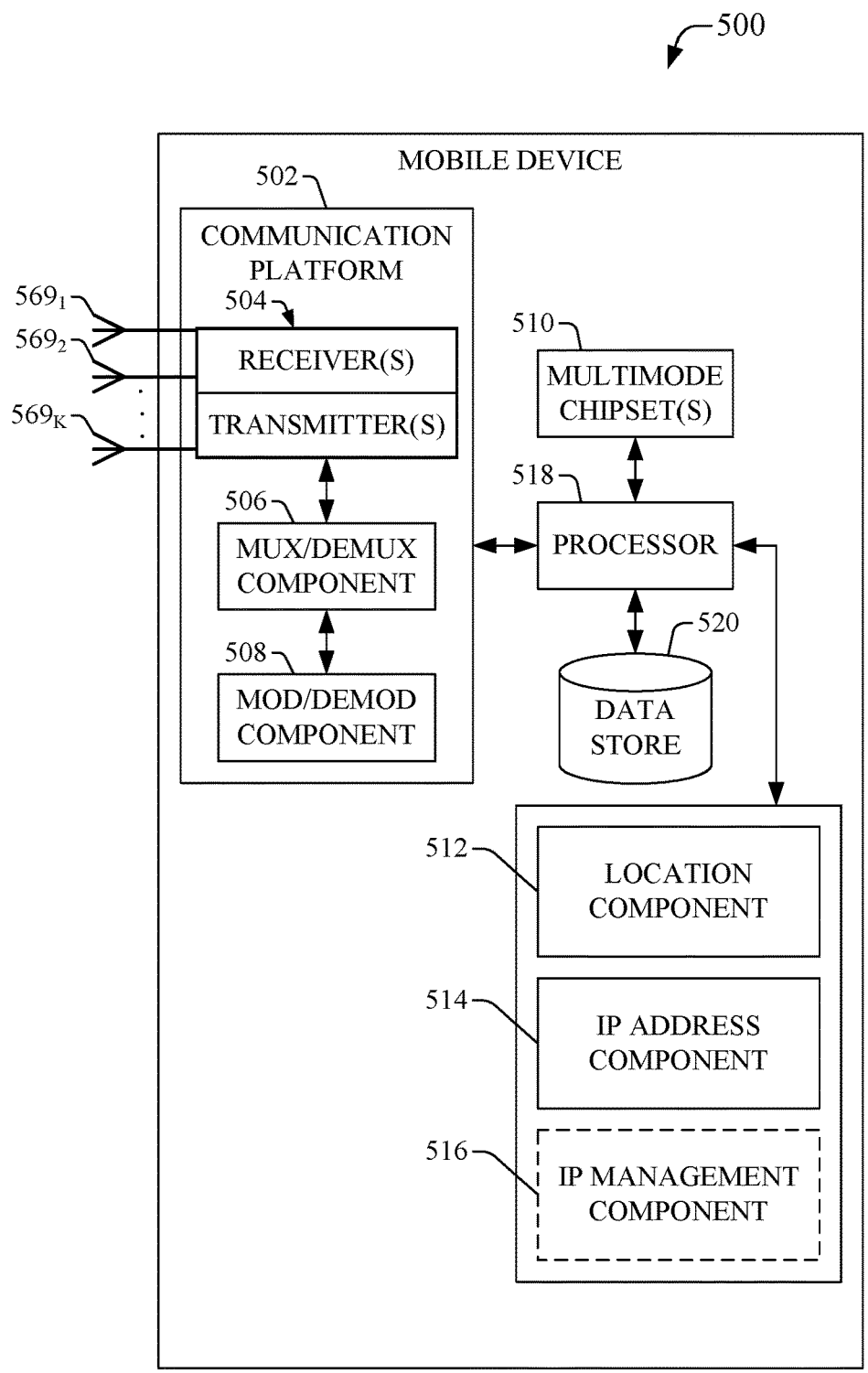
FIG. 5 depicts a block diagram of an example mobile device in accordance with an aspect of the disclosed subject matter.

FIG. 5 depicts a block diagram of an example mobile device 500 (e.g., UE) in accordance with an aspect of the disclosed subject matter. In an aspect, the mobile device 500 can be a multimode access terminal, wherein a set of antennas $569_1$-$569_Q$ (Q is a positive integer) can receive and transmit signal(s) from and to wireless devices like access points, access terminals, wireless ports and routers, and so forth, that operate in a radio access network. It should be appreciated that antennas $569_1$-$569_Q$ are a part of communication platform 502, which comprises electronic components and associated circuitry that provide for processing and manipulation of received signal(s) and signal(s) to be transmitted; e.g., receivers and transmitters 504, multiplexer/demultiplexer (mux/demux) component 506, and modulation/demodulation (mod/demod) component 508.

In another aspect, multimode operation chipset(s) 510 can allow the mobile device 500 to operate in multiple communication modes in accordance with disparate technical specification for wireless technologies. In an aspect, multimode operation chipset(s) 510 can utilize communication platform 502 in accordance with a specific mode of operation (e.g., voice, GPS). In another aspect, multimode operation chipset(s) 510 can be scheduled to operate concurrently (e.g., when Q>1) in various modes or within a multitask paradigm.

In still another aspect, the mobile device 500 can comprise a location component 512 that can generate and/or provide physical location information that can facilitate identifying the current physical geographical location of the mobile device 500, and can communicate (e.g., directly or indirectly) the physical location information to an IP management component (e.g., 400) via a serving AP (e.g., base station). The mobile device 500 also can include an IP address component 514 that can obtain or receive an IP address assigned to the mobile device 500 when an internet connection is established, and/or can provide or communicate the IP address, for example, as part of a data communication associated with the mobile device 500 to facilitate enabling other components (e.g., core network, IP management component, etc.) to identify the mobile device 500.

In accordance with an embodiment, the mobile device 500 optionally can include an IP management component 516 that can dynamically incorporate a current physical location value as part of an IP address to generate a modified IP address associated with another communication device (e.g., a server, a computer, a phone, etc.) and can dynamically route data traffic, based at least in part on the modified IP address and current physical location value (e.g., by verifying whether a device representing itself to be a particular communication device is in fact the particular communication device based at least in part on the current physical location value of the device and routing data traffic accordingly based at least in part on predefined IP rules), to facilitate enhanced security with regard to data communications associated with the UEs 302 and 304.

The mobile device 500 also can include a processor(s) 518 that can be configured to confer functionality, at least in part, to substantially any electronic component within the mobile device 500, in accordance with aspects of the subject application. As an example, the processor(s) 518 can facilitate enabling the location component 512 to generate and/or provide physical location information relating to the current physical location of the mobile device 500; can facilitate enabling the IP address component 514 to obtain or receive an IP address assigned to the mobile device 500 when an internet connection is established, and/or can provide or communicate the IP address to a desired component (e.g., AP, IP management component, core network, etc.); can facilitate incorporating a physical location value as part of an IP address associated with a communication device to create a modified IP address; can facilitate verifying whether a communication device (e.g., server) is actually the device it is representing itself to be or is an imposter device based at least in part on a physical location value associated with a modified IP address relating to such communication device; and can facilitate routing data traffic associated with the mobile device 500. Further, the processor(s) 518 can facilitate enabling the mobile device 500 to process data (e.g., symbols, bits, or chips) for multiplexing/demultiplexing, modulation/demodulation, such as implementing direct and inverse fast Fourier transforms, selection of modulation rates, selection of data packet formats, inter-packet times, etc.

The mobile device 500 also can contain a data store 520 that can store data structures (e.g., user data, metadata); code structure(s) (e.g., modules, objects, classes, procedures) or instructions; physical location information associated with the mobile device 500; IP address information associated with the mobile device 500; current physical location values of respective communication devices; original and modified IP addresses respectively associated with communication devices; respective mappings relating to modified IP addresses of respective communication devices; randomly generated numbers; translation table; network or device information like policies and specifications, attachment protocols; code sequences for scrambling, spreading and pilot (e.g., reference signal(s)) transmission; frequency offsets; cell IDs; encoding algorithms; compression algorithms; decoding algorithms; decompression algorithms; and so on. In an aspect, the processor(s) 518 can be functionally coupled (e.g., through a memory bus) to the data store 520 in order to store and retrieve information (e.g., physical location information, IP address information, etc.) desired to operate and/or confer functionality, at least in part, to communication platform 502, multimode operation chipset(s) 510, location component 512, IP address component 514, IP management component 516, and/or substantially any other operational aspects of the mobile device 500.

Figure 6:
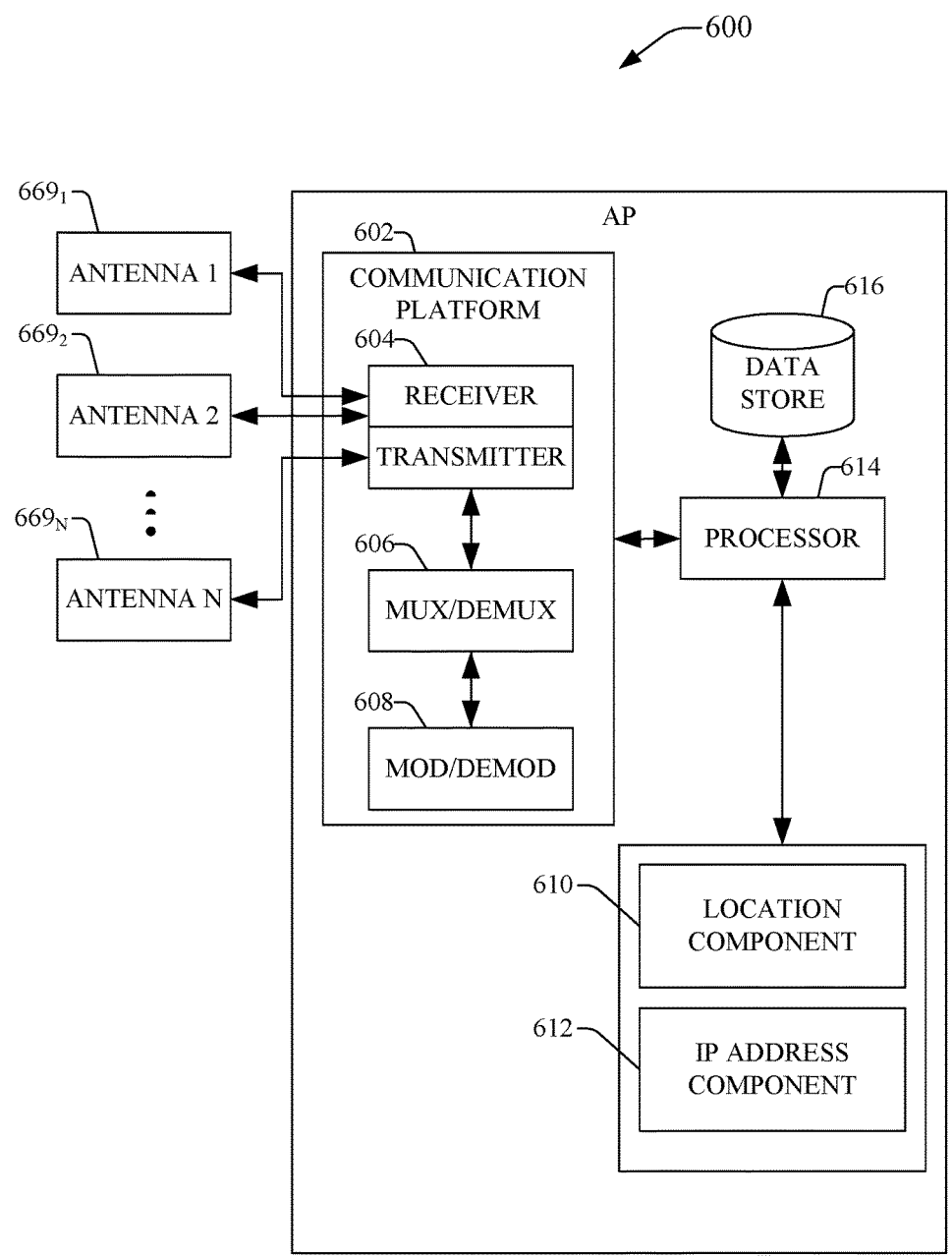
FIG. 6 illustrates a block diagram of an example access point (AP) in accordance with an aspect of the disclosed subject matter.

FIG. 6 illustrates a block diagram of an example AP 600 (e.g., base station) in accordance with an aspect of the disclosed subject matter. The AP 600 can receive and transmit signal(s) from and to wireless devices like access points (e.g., base stations, femto APs, pico APs), access terminals, wireless ports and routers, and the like, through a set of antennas $669_1$-$669_N$. It should be appreciated that while antennas $669_1$-$669_N$ are a part of a communication platform 602, which comprises electronic components and associated circuitry that can provide for processing and manipulation of received signal(s) and signal(s) to be transmitted. In an aspect, the communication platform 602 can include a receiver/transmitter 604 that can convert signal from analog to digital upon reception, and from digital to analog upon transmission. In addition, receiver/transmitter 604 can divide a single data stream into multiple, parallel data streams, or perform the reciprocal operation.

In an aspect, coupled to receiver/transmitter 604 can be a multiplexer/demultiplexer (mux/demux) 606 that can facilitate manipulation of signal in time and frequency space. The mux/demux 606 can multiplex information (e.g., data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, mux/demux component 606 can scramble and spread information (e.g., codes) according to substantially any code known in the art, e.g., Hadamard-Walsh codes, Baker codes, Kasami codes, polyphase codes, and so on. A modulator/demodulator (mod/demod) 608 also can be part of an operational group, and can modulate information according to multiple modulation techniques, such as frequency modulation, amplitude modulation (e.g., M-ary quadrature amplitude modulation (QAM), with M a positive integer), phase-shift keying (PSK), and the like.

In still another aspect, the AP 600 can comprise a location component 610 that can obtain or receive physical location information of respective UEs associated with the AP 600, and can communicate (e.g., directly or indirectly) the physical location information to an IP management component (e.g., 400). The AP 600 also can include an IP address component 612 that can obtain, receive, or identify respective IP addresses associated with respective UEs. The IP address component 612 can communicate the IP addresses to the IP management component.

The AP 600 also can comprise a processor(s) 614 that can be configured to confer and/or facilitate providing functionality, at least partially, to substantially any electronic component in or associated with the AP 600. For instance, the processor(s) 614 can facilitate enabling the location component 710 to obtain or receive physical location information of respective UEs and providing the physical location information to the IP management component; and the processor(s) 614 can facilitate enabling the IP address component 612 to obtain, receive, or identify respective IP addresses associated with respective UEs, and communicate the IP addresses to the IP management component. In addition, the processor(s) 614 can facilitate operations on data (e.g., symbols, bits, or chips) for multiplexing/demultiplexing, such as effecting direct and inverse fast Fourier transforms, selection of modulation rates, selection of data packet formats, inter-packet times, etc.

In another aspect, the AP 600 can include a data store 616 that can store data structures; code instructions; physical location information or an IP address associated with a UE (e.g., mobile device) served by the AP 600; rate coding information associated with the served mobile device; system or device information like policies and specifications; code sequences for scrambling; spreading and pilot transmission; floor plan configuration; access point deployment and frequency plans; scheduling policies; and so on. The processor(s) 614 can be coupled to the data store 616 in order to store and retrieve information (e.g., physical location information associated with a UE, IP address associated with a UE, etc.) desired to operate and/or confer functionality to the communication platform 602, receiver/transmitter 604, mux/demux component 606, mod/demod 608, location component 610, IP address component 612, and/or other operational components of AP 600.

In view of the example systems described herein, example methodologies that can be implemented in accordance with the disclosed subject matter can be better appreciated with reference to flowcharts in FIGS. 7-10. For purposes of simplicity of explanation, example methodologies disclosed herein are presented and described as a series of acts; however, it is to be understood and appreciated that the claimed subject matter is not limited by the order of acts, as some acts may occur in different orders and/or concurrently with other acts from that shown and described herein. For example, a methodology disclosed herein could alternatively be represented as a series of interrelated states or events, such as in a state diagram. Moreover, interaction diagram(s) may represent methodologies in accordance with the disclosed subject matter when disparate entities enact disparate portions of the methodologies. Furthermore, not all illustrated acts may be required to implement a methodology in accordance with the subject specification. It should be further appreciated that the methodologies disclosed throughout the subject specification are capable of being stored on an article of manufacture to facilitate transporting and transferring such methodologies to computers for execution by a processor or for storage in a memory.

Figure 7:
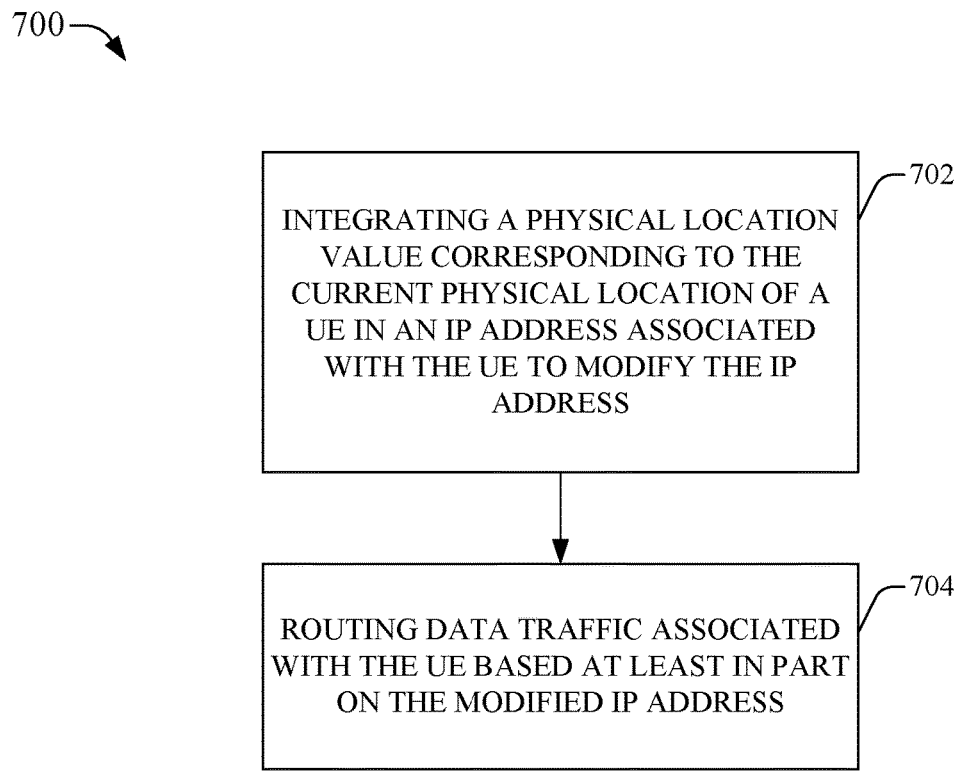
FIG. 7 illustrates a flowchart of an example methodology for incorporating a current physical location value in an IP address associated with a communication device in a communication network in accordance with various aspects of the disclosed subject matter.

FIG. 7 presents a flowchart of an example methodology 700 for incorporating a current physical location value in an IP address associated with a communication device (e.g., UE) in a communication network in accordance with various aspects of the disclosed subject matter. At 702, a physical location value corresponding to the current physical location of the UE can be dynamically or automatically integrated in or incorporated with an IP address associated with the UE to modify the IP address. In an aspect, an IP management component can obtain and/or identify a current physical location of a UE, for example, during initiation of a communication session associated with the internet. The current physical location can be represented by a current physical location value that corresponds to the current physical location of the UE. The IP management component can integrate or incorporate the current physical location value with the IP address assigned to the UE, for example, by translating the originally assigned IP address using the current physical location value and/or a randomly generated number to modify the originally assigned IP address to a modified or translated IP address. The modified IP address, the current physical location value, and/or original IP address can be mapped with each other and stored in a translation table associated with the IP management component.

At 704, data traffic associated with the UE can be routed (e.g., automatically or dynamically routed) based at least in part on the modified IP address. In an aspect, the IP management component can monitor data traffic associated with UEs in the communication network. The IP management component can detect and identify data traffic associated with the UE or ostensibly associated with the UE, based at least in part on information (e.g., source IP address, destination IP address) associated with the data traffic, being communicated or ostensibly being communicated to or from the UE. The IP management component can reference the modified IP addresses that respectively correspond to the source IP address and destination IP address associated with the data traffic (e.g., reference modified IP address of UE that is the same as the source IP address; reference another modified IP address of another UE that is the same as the destination IP address). For each referenced modified IP address, the IP management component can retrieve the original IP address, modified IP address, current physical location value, associated mapping, and/or other information (e.g., randomly generated number) of the UE from a translation table stored in a data store associated with the IP management component based at least in part on the information associated with the data traffic (e.g., IP management component can reference the stored modified IP address of the UE that corresponds to the source IP address or destination IP address associated with the data traffic, and can retrieve desired parameters from the translation table that are associated with the modified IP address of the UE). The IP management component can obtain and/or identify the respective current physical locations of a source UE and/or destination UE associated with the data traffic that is associated with the respective IP addresses (e.g., source IP address, destination IP address) ostensibly related to the respective UEs (e.g., referenced UEs), where such respective current physical locations can be converted to respective current physical location values respectively associated with the source UE and/or destination UE. For each of the referenced UEs, the IP management component can evaluate or compare the stored current physical location value associated with the referenced UE to the current physical location value associated with the source or destination UE (whichever is applicable with regard to the referenced UE) and/or other information to facilitate determining whether the source or destination UE (whichever is applicable) is actually the UE or is instead another UE attempting to masquerade as the UE (e.g., via a spoofing attack).

If the IP management component determines that the stored current physical location value associated with the referenced UE is the same (e.g., has the same value) as the current physical location value associated with the source or destination UE (whichever is applicable), the IP management component can generate routing information that can be provided to the desired component (e.g., gateway, router, etc.) to facilitate routing the data traffic to the UE when the UE is the destination UE or to a destination UE when the UE is the source UE, and the desired component can route the data traffic accordingly. Conversely, if the IP management component determines that the stored current physical location value associated with the referenced UE is not the same as the current physical location value associated with the source or destination UE (whichever is applicable), the IP management component can generate routing information that can be provided to the desired component (e.g., gateway, router, etc.) to facilitate not routing the data traffic to the destination UE (whether the imposter UE is a source UE attempting to inappropriately obtain information from or inappropriately gain access to a destination UE, or the destination UE is an imposter UE obtaining to attack a source UE and inappropriately obtain information from the source UE), and the desired component can route the data traffic accordingly (e.g., not send the data traffic to the destination UE, discard the data traffic, etc.). In another aspect, the IP management component also can flag the imposter UE and can attempt to further identify the imposter UE in order learn the actual identity of the imposter UE and associated user (e.g., hacker).

Figure 8:
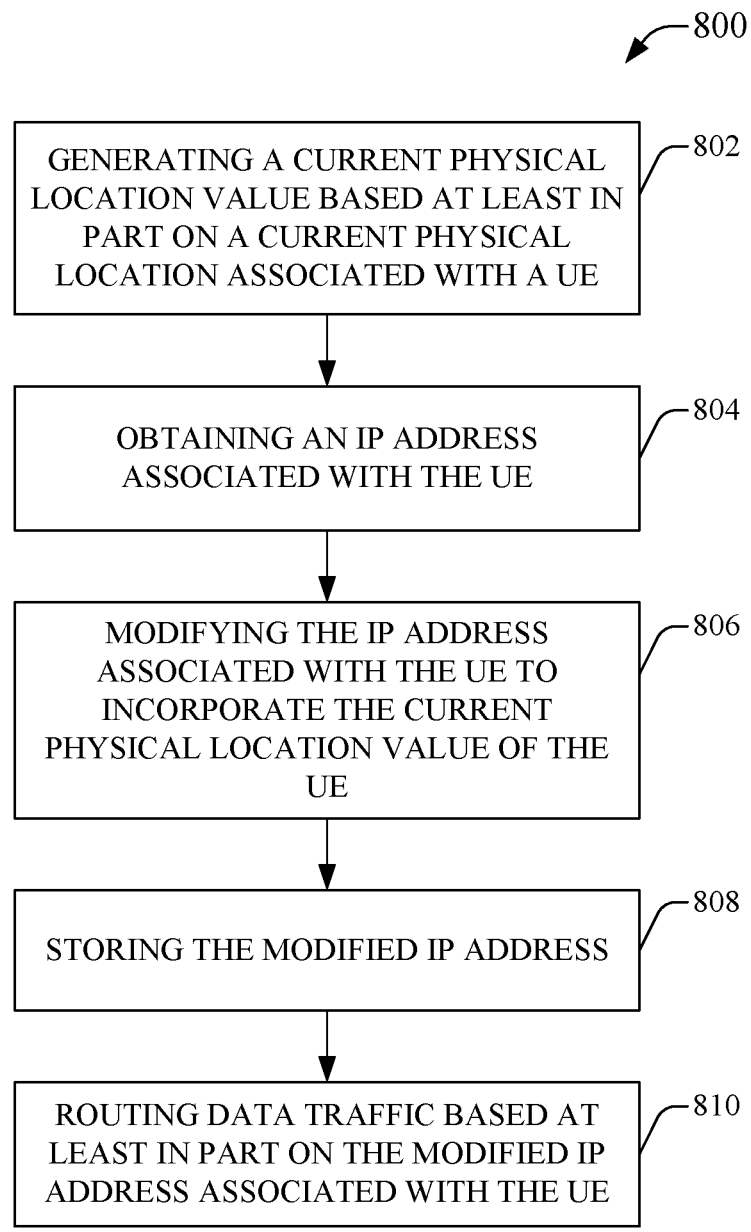
FIG. 8 depicts a flowchart of an example methodology that can incorporate a current physical location value as part of an IP address associated with a communication device in a communication network in accordance with an aspect of the disclosed subject matter.

FIG. 8 depicts a flowchart of an example methodology 800 that can incorporate a current physical location value as part of an IP address associated with a communication device (e.g., UE) in a communication network in accordance with an aspect of the disclosed subject matter. At 802, a current physical location value can be generated based at least in part on a current physical location associated with a UE. In an aspect, information relating to a current physical location of a UE can be obtained, and an IP management component can convert the current physical location to generate a current physical location value. At 804, an IP address associated with the UE can be obtained. In accordance with one aspect, the IP management component can obtain the IP address associated with (e.g., assigned to) the UE.

At 806, the IP address associated with the UE can be modified (e.g., automatically or dynamically modified) to include or incorporate the current physical location value of the UE. In an aspect, the IP management component can modify or translate the IP address associated with the UE using the current physical location value to modify the IP address based at least in part on the current physical location value. In accordance with an embodiment, in addition to using the current physical location value, a randomly generated number also can be used in conjunction with the current physical location value to modify or translate the IP address to generate a modified IP address.

At 808, the modified IP address can be stored. In an aspect, the IP management component can store the modified IP address associated with the UE as well as the original IP address, current physical location value, associated mapping of such parameters, and/or other information in a translation table, which can be stored in a data store associated with the IP management component.

At 810, data traffic can be routed (e.g., automatically or dynamically routed) based at least in part on the modified IP address associated with the UE. In an aspect, the IP management component can facilitate routing data traffic based at least in part on the modified IP address associated with the UE, for instance, as more fully described with regard to methodology 700. As a result, data traffic can be communicated between the UE and another communication device based at least in part on the modified IP address, incorporating the current physical location value, associated with the UE, and thereby not allowing an imposter UE (e.g., foreign UE) attempting to impersonate the UE to send data to another communication device to inappropriately obtain information from the other communication device and/or inappropriately receive information from another UE that is falsely led to believe that the imposter UE is the UE.

Figure 9:
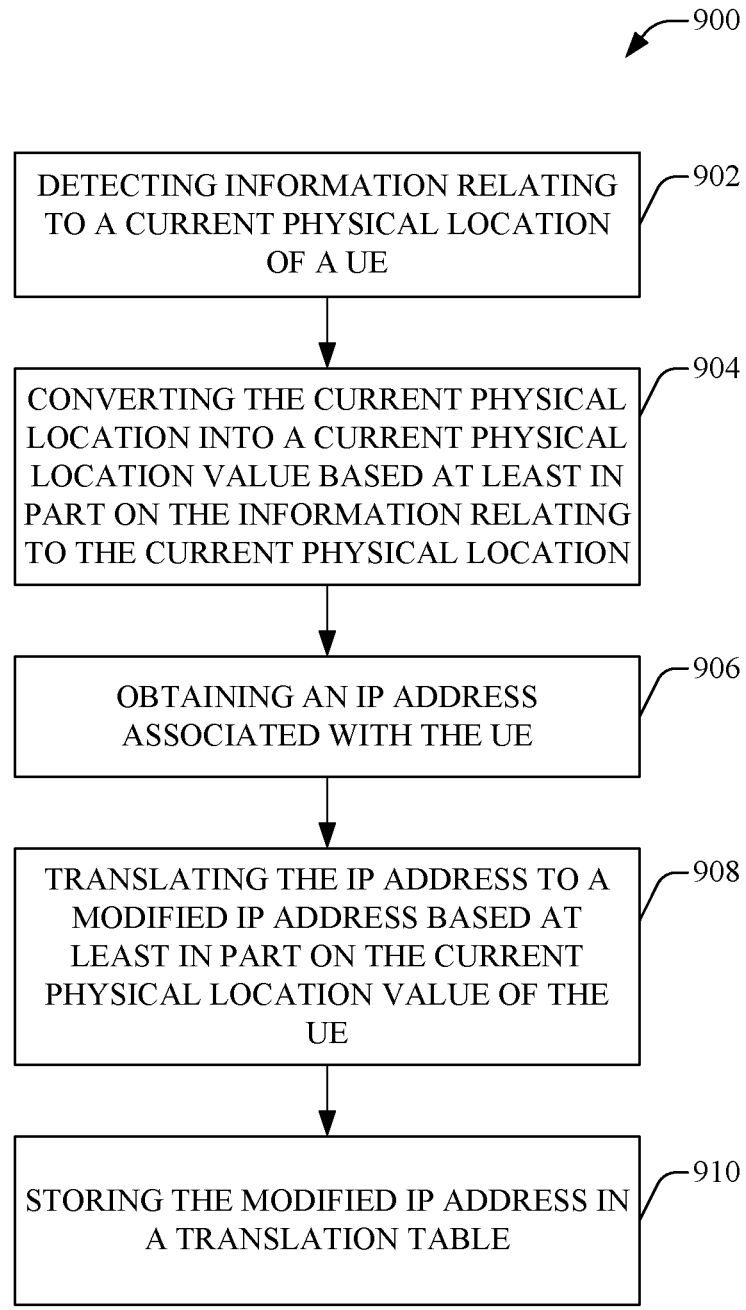
FIG. 9 illustrates a flowchart of an example methodology that can translate an IP address associated with a communication device using a current physical location value associated with the communication device in a communication network in accordance with an aspect of the disclosed subject matter.

FIG. 9 illustrates a flowchart of an example methodology 900 that can translate an IP address associated with a UE using a current physical location value associated with the UE in a communication network in accordance with an aspect of the disclosed subject matter. At 902, information relating to a current physical location of a UE can be detected. In an aspect, an IP management component can detect or obtain the information relating to the current physical location of the UE. At 904, the current physical location can be converted into a current physical location value (e.g., current physical location geo-spatial co-ordinate) based at least in part on the information relating to the current physical location. In an aspect, the IP management component can analyze the information relating to the current physical location (e.g., latitude, longitude, and/or altitude) of the UE, and based at least in part on such information analysis, the IP management component can convert the current physical location of the UE into a current physical location value. At 906, an IP address associated with the UE can be obtained. In an aspect, the UE can have an IP address assigned to it. The IP management component can obtain or detect the IP address associated with the UE.

At 908, the IP address can be translated to a modified IP address based at least in part on the current physical location value of the UE. In an aspect, the IP management component can apply the current physical location value associated with the UE to the IP address, for example, using a desired predefined translation algorithm, to translate the IP address into the modified IP address, which now has the current physical location value incorporated therein. In accordance with an embodiment, optionally, as desired, the IP management component also can generate of obtain a true or pseudo randomly generated number, which, along with the current physical location value, can be applied to the IP address, for example, using another desired predefined translation algorithm, to translate the IP address to a modified IP address, which thereby incorporates the current physical location value and randomly generated number therein. At 910, the modified IP address can be stored in a translation table. The IP management component can store the modified IP address, the original IP address, the current physical location value, the randomly generated number (if any), and/or other information in the translation table. Further, the IP management component can generate a mapping between such parameters to facilitate secure data communications associated with the UE and other communication devices in the communication network. The mapping can be stored in the translation table with the other parameters as well.

Figure 10:
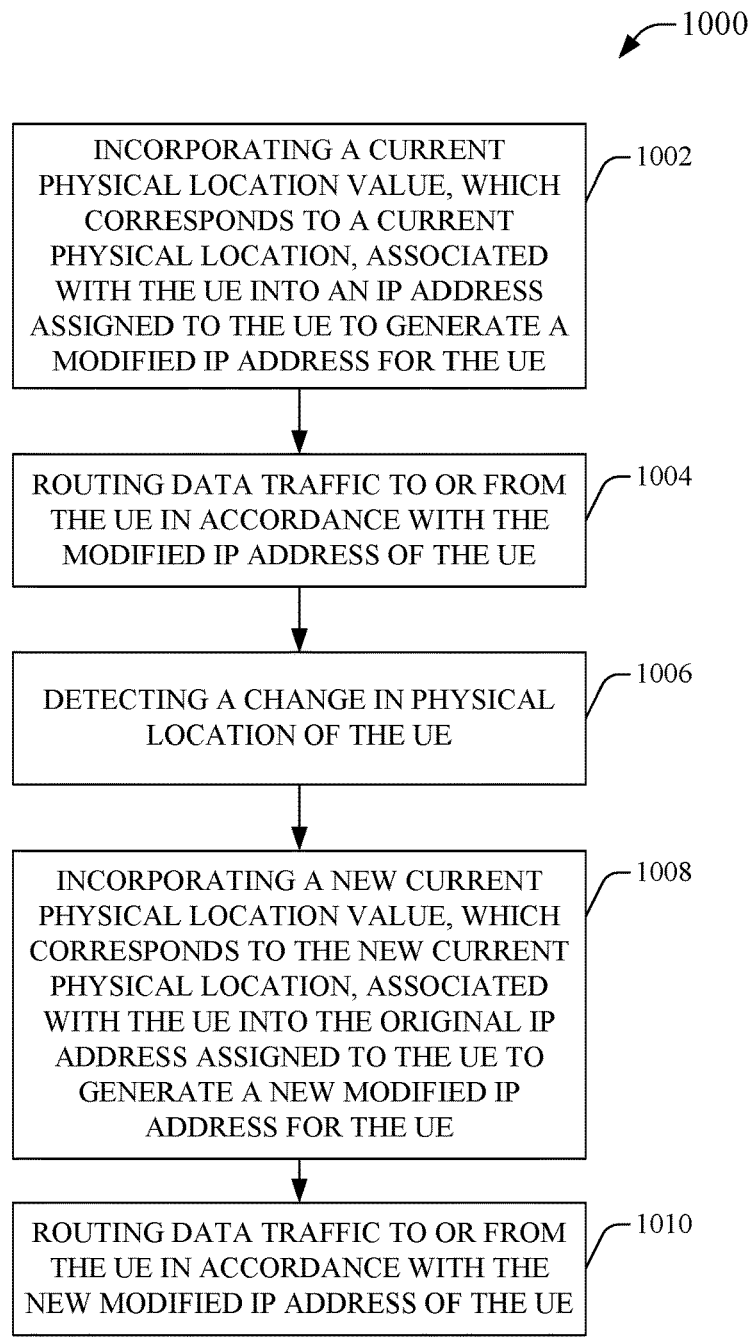
FIG. 10 depicts a flowchart of an example methodology that can re-translate an IP address associated with a communication device using a new current physical location value associated with the communication device when the communication device moves to a new physical location in a communication network in accordance with an aspect of the disclosed subject matter.

FIG. 10 illustrates a flowchart of an example methodology 1000 that can re-translate an IP address associated with a UE using a new current physical location value associated with the UE when the UE moves to a new physical location in a communication network in accordance with an aspect of the disclosed subject matter. At 1002, a current physical location value, which corresponds to a current physical location, associated with the UE can be incorporated (e.g., automatically or dynamically incorporated) into an IP address assigned to the UE to generate a modified IP address for the UE. In an aspect, the IP management component can incorporate the current physical location value of the UE as part of the IP address of the UE, for example, by translating the IP address based at least in part on the current physical location value, such as more fully described herein (e.g., in methodology 900).

At 1004, data traffic can be routed (e.g., automatically or dynamically routed) to or from the UE in accordance with the modified IP address of the UE. The IP management component can utilize the modified IP address and associated current physical location value incorporated therein to facilitate routing data traffic associated with the UE while the UE is at that same physical location to facilitate secure data communications (e.g., to prevent undesired intrusions by hackers into data communications associated with the UE). For instance, the modified IP address, original IP address, current physical location value, associated mapping, and/or other information can be stored in a translation table. When data traffic associated with the UE, or at least ostensibly associated with the UE, is detected by the IP management component (e.g., when data traffic contains a source IP address or destination IP address is related to the original IP address of the UE), the IP management component can retrieve the modified IP address, original IP address, current physical location value, associated mapping, and/or other information from a translation table and can utilize such information to facilitate determining whether the data traffic actually is associated with the UE or is instead associated with another communication device masquerading as the UE.

At 1006, a change in physical location of the UE can be detected. In an aspect, the IP management component can detect a change in physical location of the UE, for example, when the UE moves from the original geographical location to a new physical location (e.g., new defined physical location space) that is represented by a different physical location value. At 1008, a new current physical location value, which corresponds to the new current physical location, associated with the UE can be incorporated (e.g., automatically or dynamically incorporated) into the original IP address assigned to the UE to generate a new modified IP address for the UE. The IP management component can obtain or generate a new current physical location value based at least in part on information relating to the detected new current physical location of the UE (e.g., latitude, longitude, and/or altitude at the new physical location of the UE).

At 1010, data traffic can be routed (e.g., automatically or dynamically routed) to or from the UE in accordance with the new modified IP address of the UE. In an aspect, the IP management component can store the new modified IP address, original IP address, new current physical location value, associated mapping, and/or other information (e.g., randomly generated number; associated other desired physical location values, for example, corresponding to defined physical location spaces that are near, adjacent to or proximate to the defined physical location space represented by the current physical location value, such as more fully disclosed herein) in the translation table. The IP management component can utilize the new modified IP address and associated new current physical location value incorporated therein to facilitate routing data traffic associated with the UE while the UE is at that new current physical location to facilitate secure data communications.

It is to be appreciated and understood that methodology 1000 can be varied, as desired, so that, for example, a re-modification of the IP address associated with the UE is not triggered until the UE has moved at least a predefined amount of distance away from the current physical location (e.g., current defined physical location space) associated with the current physical location value, in accordance with a specified predefined IP rule. As another example of a variance of methodology 1000, in accordance with the subject application, the current physical location value can be associated with one or more other desired physical location values, which represent corresponding defined physical location spaces (e.g., near, adjacent to, proximate to the current defined physical location space associated with the current physical location value), and a re-modification of the IP address associated with the UE is not triggered until the UE has moved from the current physical location (e.g., current defined physical location space) associated with the current physical location value to a defined physical location space that has a corresponding physical location value that is not the current physical location or any of the associated other desired physical location values, in accordance with another specified predefined IP rule.

It also is to be appreciated and understood that components (e.g., UE, base station, AP, IP management component, access network, core network, . . . ), as described with regard to a particular system or methodology, can include the same or similar functionality as respective components (e.g., respectively named components) as described with regard to other systems or methodologies disclosed herein.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," data storage," "database," and substantially any other information storage component relevant to operation and functionality of a component, refer to "memory components," or entities embodied in a "memory" or components comprising the memory. For example, information relevant to operation of various components described in the disclosed subject matter, and that can be stored in a memory, can comprise, but is not limited to comprising, subscriber information; cell configuration (e.g., devices served by an AP) or service policies and specifications; privacy policies; and so forth. It will be appreciated that the memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), phase change memory (PCM), flash memory, or nonvolatile RAM (e.g., ferroelectric RAM (FeRAM). Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD), Blu-ray disc (BD), . . . ), smart cards, and flash memory devices (e.g., card, stick, key drive . . . ).

What has been described above includes examples of systems and methods that provide advantages of the subject application. It is, of course, not possible to describe every conceivable combination of components or methodologies for purposes of describing the claimed subject matter, but one of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
a processor; and
a memory that stores executable instructions that, when executed by the processor, facilitate performance of operations, comprising:
translating a network address as a function of a first physical location of a mobile device;
in response to the translating, modifying the network address to comprise a first location value representative of a second physical location adjacent to the first physical location of the mobile device, resulting in a modified network address;
in response to the modifying the network address, comparing a second location value representative of the first physical location to the first location value of the second physical location; and
in response to a condition associated with the comparing being determined to have been satisfied, identifying the mobile device.

2. The system of claim 1, wherein the comparing comprises:
comparing the second location value representative of the first physical location to a stored location value associated with the first physical location.

3. The system of claim 2, wherein the operations further comprise:
based on a result of the comparing, determining that the second location value and the stored location value are a same value.

4. The system of claim 3, wherein the mobile device is a first mobile device, and wherein the operations further comprise:
in response to the determining that the second location value and the stored location value are the same value, routing communication data, representative of a communication, to a second mobile device other than the first mobile device.

5. The system of claim 2, wherein the operations further comprise:
based on a result of the comparing, determining that an actual location value and the stored location value are not a same value and that communication data is not being sent from the mobile device.

6. The system of claim 1, wherein the operations further comprise:
mapping the modified network address to a value associated with the second physical location.

7. The system of claim 6, wherein the second physical location is a current physical location of the mobile device.

8. The system of claim 1, wherein the operations further comprise:
mapping the modified network address to a value associated with a third physical location representative of a requested physical location of the mobile device.

9. The system of claim 1, wherein the translating the network address as the function of the first physical location of the mobile device comprises modifying the network address to comprise a randomly generated number.

10. A method, comprising:
receiving, by a system comprising a processor, an internet protocol address associated with a mobile device;
adding, by the system, a first location value of a first location associated with the mobile device to the internet protocol address, resulting in a first updated internet protocol address, wherein the first location is adjacent to a second location of the mobile device;
translating, by the system, the first updated internet protocol address as a function of the second location;
based on a result of the translating, modifying, by the system, the first updated internet protocol address to comprise a location value associated with the first location, resulting in a second updated internet protocol address; and
based on the second updated internet protocol address, determining, by the system, that the mobile device is at the first location.

11. The method of claim 10, further comprising:
determining, by the system, that communication data associated with the mobile device is not being sent from the first location.

12. The method of claim 11, wherein the mobile device is a first mobile device, and further comprising:
in response to the determining, associating, by the system, the communication data with a second mobile device different than the first mobile device.

13. The method of claim 12, further comprising:
based on the associating the communication data with the second mobile device, discarding, by the system, the communication data.

14. The method of claim 12, wherein the internet protocol address is a first internet protocol address, and further comprising:
based on the associating the communication data with the second mobile device, routing, by the system, the communication data to a second internet protocol address that is not the first internet protocol address.

15. The method of claim 12, further comprising:
in response to the associating the communication data with the second mobile device, flagging, by the system, a communication associated with the communication data from the second mobile device as a security breach.

16. The method of claim 15, further comprising:
in response to the flagging, monitoring, by the system, additional communications received from the second mobile device.

17. A non-transitory machine-readable medium comprising executable instructions that, when executed by a processor, facilitate performance of operations, comprising:
receiving an internet protocol address associated with a mobile device;
translating the internet protocol address as a function of a first location value of a first location of the mobile device, resulting in a translated internet protocol address;
based on the translated internet protocol address, modifying the internet protocol address by adding a second location value associated with a second location of the mobile device, resulting in a modified internet protocol address, wherein the second location is a potential location of the mobile device, and wherein the potential location of the mobile device is adjacent to the first location of the mobile device; and
in response to a condition associated with comparing the first location value to the second location value being determined to have been satisfied, determining that signal data has been received from the mobile device, wherein the condition being satisfied is independent of the modified internet protocol address.

18. The non-transitory machine-readable medium of claim 17, wherein the potential location is a first potential location, and wherein the operations further comprise:
comparing a third location value associated with a second potential location of the mobile device to the first location value; and
in response to the comparing, determining that the third location value is not a same value as the first location value.

19. The non-transitory machine-readable medium of claim 18, wherein the mobile device is a first mobile device, wherein the signal data is first signal data, and wherein the operations further comprise:
in response to the determining that the third location value is not the same value as the first location value, determining that a second mobile device is attempting to send second signal data via the internet protocol address associated with the mobile device.

20. The non-transitory machine-readable medium of claim 19, wherein the operations further comprise:
in response to the determining that the second mobile device is attempting to send second signal data via the internet protocol address associated with the first mobile device, monitoring a fourth location associated with the second mobile device.

* * * * *